United States Patent [19]
Murakami

[11] Patent Number: 5,987,503
[45] Date of Patent: Nov. 16, 1999

[54] SYSTEM AND METHOD FOR DISPLAYING AN ELECTRONIC MAIL CONTAINING A KEYWORD DETECTED IN A CHAT SESSION MESSAGE

[75] Inventor: Masahiko Murakami, Kawasaki, Japan

[73] Assignee: Fujitsu Limited, Kawasaki, Japan

[21] Appl. No.: 08/777,886

[22] Filed: Dec. 31, 1996

[30] Foreign Application Priority Data

Jun. 28, 1996 [JP] Japan .................................. 8-170504
Oct. 25, 1996 [JP] Japan .................................. 8-284288

[51] Int. Cl.$^6$ .................................................. G06F 15/16
[52] U.S. Cl. .......................................... 709/204; 709/206
[58] Field of Search ........................ 395/200.37, 200.31, 395/200.33, 200.34, 200.35, 200.36, 200.47, 200.48, 200.49; 707/4, 104; 379/93.01, 93.21, 93.23, 93.24, 100.08

[56] References Cited

U.S. PATENT DOCUMENTS

| | | | |
|---|---|---|---|
| 5,339,156 | 8/1994 | Ishii ........................................ | 358/402 |
| 5,377,354 | 12/1994 | Scannell et al. ......................... | 395/673 |
| 5,555,346 | 9/1996 | Gross et al. .............................. | 706/45 |
| 5,590,178 | 12/1996 | Murakami et al. .................. | 379/93.18 |
| 5,613,108 | 3/1997 | Morikawa ............................... | 707/200 |
| 5,632,018 | 5/1997 | Otorii .................................... | 395/200.3 |
| 5,675,507 | 10/1997 | Bobo, II .............................. | 395/200.36 |
| 5,727,175 | 3/1998 | Malone et al. .......................... | 345/356 |
| 5,752,059 | 5/1998 | Holleran et al. .................... | 395/200.75 |
| 5,764,916 | 6/1998 | Busey et al. ........................ | 395/200.57 |
| 5,784,568 | 7/1998 | Needham ............................. | 395/200.64 |
| 5,790,116 | 8/1998 | Malone et al. ............................ | 345/335 |
| 5,793,365 | 8/1998 | Tang et al. ............................... | 345/329 |
| 5,828,839 | 10/1998 | Moncreiff ............................ | 395/200.34 |

Primary Examiner—Zarni Maung
Assistant Examiner—Andrew Caldwell
Attorney, Agent, or Firm—Staas & Halsey

[57] ABSTRACT

A system and method for displaying an electronic mail message related to a statement submitted in an online chat session. Statements submitted by participants in the online chat session are searched for a specified keyword. When the keyword is detected in a statement submitted by a first participant in the chat session, mail boxes of the first participant and a specified second participant are searched for electronic mail messages related to the specified keyword. The related electronic mail messages are read from the respective mail boxes and displayed on a terminal unit of the second participant.

40 Claims, 18 Drawing Sheets

FIG. 5

```
From:ABC00129
To:DEF00243
Date:Tue,16 Feb 96 04:35:11 JST
Message-ID:<9602151935.AA20267>

This is Murakami.

About the last meeting,···
```

SYSTEM AND METHOD FOR DISPLAYING AN ELECTRONIC MAIL CONTAINING A KEYWORD DETECTED IN A CHAT SESSION MESSAGE

BACKGROUND OF THE INVENTION

The present invention relates to an electronic mail display method for causing a chat system and an electronic mail center to link with each other to present a received electronic mail during a chat. The invention further provides an information communication system, an electronic mail center, a chat server and a recording medium for performing the method.

Electronic mail provides a means for information communication structured as follows: An electronic mail center comprising a host computer has storage regions called mail boxes and provided to correspond to a number of receivers. The electronic mail center receives document information whose receiver is appointed from a terminal unit connected to a public telephone network through the same. In the electronic mail center, the received document information is written to a mail box corresponding to the appointed receiver. Then, the receiver reads the document information from the mail box into the receiver's terminal unit.

The receiver of the electronic mail is able to receive the electronic mail at a time convenient for the receiver. Therefore, the receiver is provided with convenience because the work being conducted by the receiver is not interrupted by the received (supplied) electronic mail, as would be the case by a call on the telephone. A sender is able to easily use the electronic mail without considering the time at which the mail is received, because thus the mail does not interrupt the receiver.

A chat system is, on the other hand, known as a means for communicating information. The chat system has a chat server which is a host computer and a plurality of terminal units connected to the same through the public telephone line. A message received by the chat server from a terminal unit is immediately transmitted to another terminal unit so that a chat between operators of the terminal units is realized by using characters.

In the chat system, on the terminal units, a content of a statement is displayed in correspondence with the name of a person who made the statement. Therefore, even if a plurality of statements are made simultaneously, confusion as to the person who made a given statement can be prevented. Moreover, the contents of the statements can reliably be communicated to other operators. Consequently, exchange of opinions is performed smoothly. Since the contents of the statements displayed on the terminal unit can be stored in the form of text data, minutes of proceedings can easily be made on the basis of the text data.

Therefore, such a chat system is suitable to allow participants to give their opinions to each other to decide their policy. However, a problem, similar to that experienced with the telephone system, arises in that the participants encounter time constraints. In a case where the contents to be communicated are brought to a conclusion, electronic mail is sometimes a more suitable method.

Accordingly, the two methods are selectively employed. That is, electronic mail is employed in a usual information exchange, and the chat system is employed when a simple communication is performed or policy is decided.

It also follows that the contents of electronic mail received previously are frequently a subject of the chat. In a case where the participants of the chat, other than the person who presented the contents of the chat, have no idea of the contents, smooth communication of opinions is difficult.

BRIEF SUMMARY OF THE INVENTION

The present invention solves the above-mentioned problems. An object of the present invention is to provide an electronic mail display method for causing a chat system and an electronic mail center to link to each other when a predetermined keyword is detected in the statement during a chat, so as to present the received electronic mail.

According to one aspect of the present invention, there is provided an electronic mail display method, comprising steps of: previously determining a keyword for instructing to display electronic mail respectively stored in a plurality of mail boxes provided to correspond to users on respective terminal units corresponding to the mail boxes; searching for the keyword in a message transmitted from a first terminal unit; searching the message for a user information for specifying a terminal unit; specifying and reading a corresponding electronic mail from among electronic mails stored in mail boxes corresponding to the first terminal unit and a second terminal unit specified in accordance with user information when the keyword is detected; and displaying the read electronic mail on the second terminal unit.

Therefore, when a predetermined keyword and information for instructing a user are used during a chat, the electronic mail center can be linked to read the corresponding electronic mail so as to present the electronic mail for the user.

According to another aspect of the present invention, there is provided an electronic mail display method, comprising steps of: previously determining a keyword for instructing to display electronic mails respectively stored in a plurality of mail boxes provided to correspond to users on terminal units corresponding to the mail boxes; searching for the keyword in a message transmitted from a first terminal unit; when the keyword is detected, a corresponding electronic mail is specified and read from among the electronic mails stored in the mail box for the first terminal unit, so as to display the electronic mail on the first terminal unit.

Therefore, when a predetermined keyword is spoken during a chat, the electronic mail center is linked to read the pertinent electronic mail so as to present the electronic mail for the user who has spoken the keyword.

The electronic mail display method of the present invention according to the foregoing method is characterized in that a keyword (for example, date of receipt/transmission or a term such as "* days before") for instructing a latest electronic mail or receipt/transmission time of the electronic mail is previously set. When the keyword is detected, the latest electronic mail or the date of receipt/transmission is searched so as to read, from the mail box corresponding to the terminal unit, the latest electronic mail or that corresponding to the date of receipt/transmission.

Therefore, the latest electronic mail or an electronic mail to be read in accordance with the date of receipt/transmission may be determined.

The electronic mail display method of the present invention, besides the structure according to the foregoing method, is characterized as follows:

(1) User information of a sender and a receiver of the electronic mail to be read respectively coincide with a user information of a user who has transmitted the message or a user who receives the message;

(2) The electronic mail to be read has user information of a user who transmitted the message and that of a user who receives the same as the user information of a receiver of the electronic mail; or (3) The electronic mail to be read has user information of a user who transmitted the message or a user information who receives the message as the user information of a sender of the electronic mail, and another user information item is designated as the user information of a receiver.

Therefore, the electronic mail to be read can be determined in accordance with the relationship between a sender and a receiver of the electronic mail.

The foregoing method may be structured such that when a plurality of electronic mails to be read exist, a list of the electronic mails is displayed to permit the user to select one.

When the electronic mail displayed on the terminal unit of the user who submitted the statement corresponds to the electronic mail to be read, the electronic mail may be read.

As a result, the electronic mail being displayed for the submitting user can be read so as to be presented to the receiver and the sender of the electronic mail.

Moreover, the electronic mail to be read may be determined in accordance with identification information of the electronic mail.

According to another aspect of the present invention, there is provided an electronic mail display method, comprising the steps of: storing electronic mails transmitted and received by users in mail boxes for respective users in an electronic mail center; causing a chat server of the chat system to display the electronic mail in the mail box of a user who is operating a terminal unit from which a predetermined keyword is submitted on the terminal unit when the keyword is submitted in a character chat performed in a chat system to which a plurality of users among the users participate; storing the same displayed electronic mail in the mail box in the electronic mail center; and displaying the electronic mail on the terminal unit which is being operated by a user who is participating the chat.

Therefore, when the predetermined keyword is submitted during the chat, the electronic mail center is linked to read the pertinent electronic mail to present the pertinent electronic mail for the receiver and the sender.

The electronic mail display method according to the present invention is characterized in that in a case where the number of the plurality of users who are participating the chat is two, the chat server causes the electronic mail in the mail box transmitted to the other user by the user who is operating the terminal unit from which the keyword is submitted to be displayed on the terminal unit, and the same electronic mail as the electronic mail stored in the mail box of the other user is displayed on the terminal unit which is being operated by the other user.

Therefore, when two persons participate in the chat and a predetermined keyword is submitted during the chat, the electronic mail center is linked to read the pertinent electronic mail and to present the same to the two participants.

Another object of the present invention is to provide an information communication system, an electronic mail center and a chat server having means for embodying the foregoing electronic mail display method in application.

Moreover, another object of the present invention is to provide a recording medium having recorded thereon a program for embodying steps of the foregoing electronic mail display method. The invention further provides a recording medium with recorded thereon a program for causing a host computer to embody steps of the foregoing electronic mail display method.

The above and further objects and features of the invention will be more fully apparent from the following detailed description with accompanying drawings.

BRIEF DESCRIPTION OF THE SEVERAL VIEWS OF THE DRAWING

FIG. 5 is an explanatory diagram showing an example of an electronic mail;

DETAILED DESCRIPTION OF THE INVENTION

Embodiments of the present invention will now be described with reference to the drawings as follows.

Figure 1:
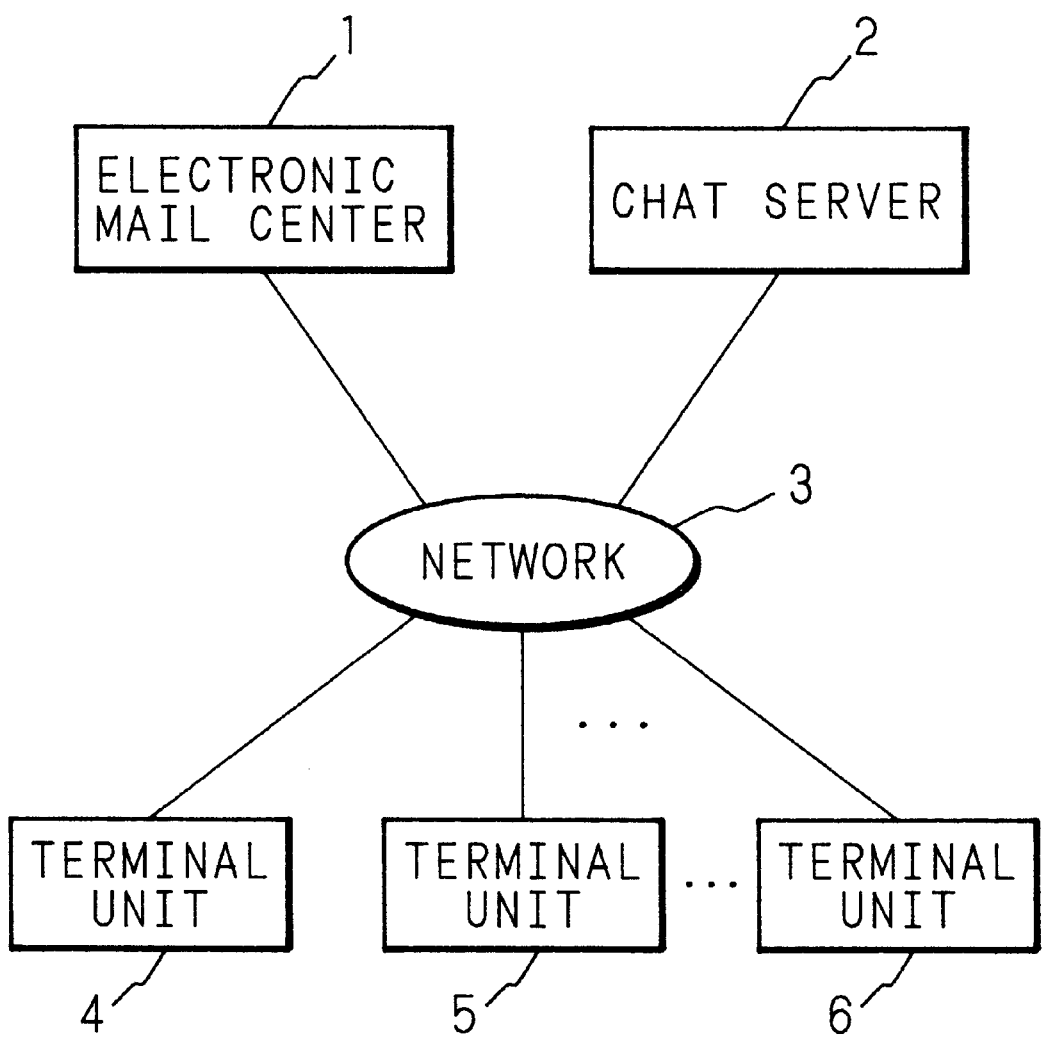
FIG. 1 is a block diagram showing an information communication apparatus according to the present invention.

FIG. 1 is a block diagram showing an information communication system according to the present invention.

Referring to FIG. 1, reference numerals 1 and 2 respectively represent an electronic mail center and a chat server each comprising a computer. Each of the electronic mail center 1 and the chat server 2 is connected to a network 3. Moreover, terminal units 4, 5, and 6 are connected to the network 3. That is, the terminal units 4, 5 and 6 respectively are connected, through the network 3, to the electronic mail center 1 and the chat server 2.

Figure 2:
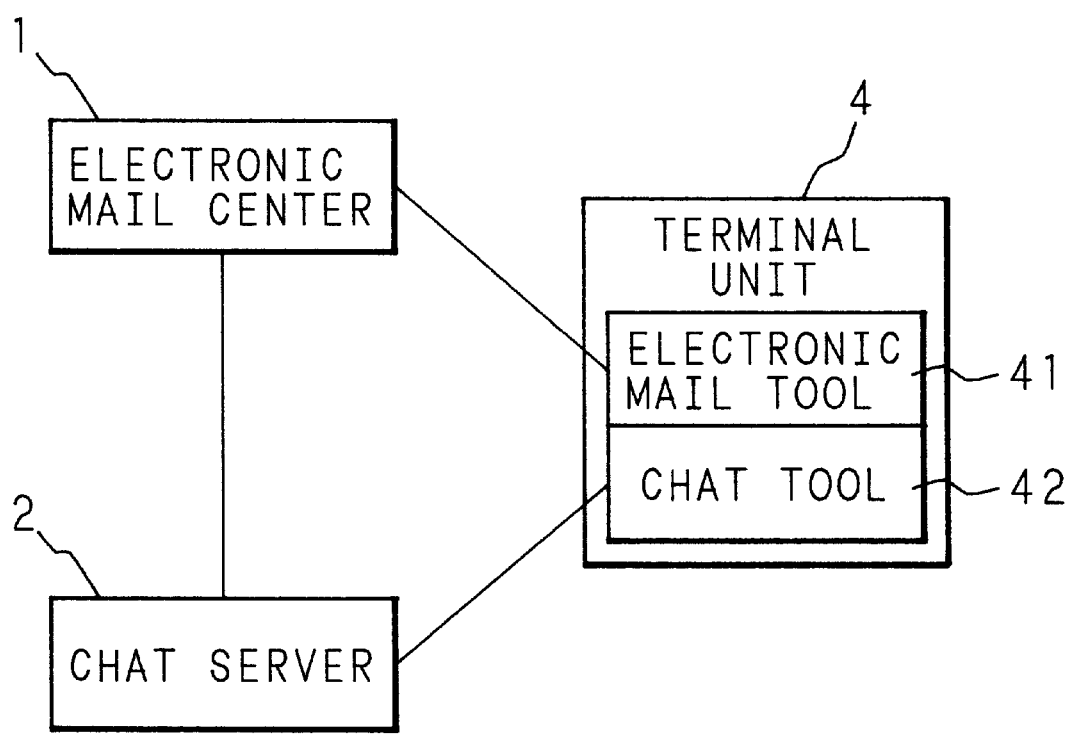
FIG. 2 is a block diagram showing an essential portion of the logical structure of the information communication apparatus according to the present invention.

FIG. 2 is a block diagram showing an essential portion of the logical structure of the information communication system according to the present invention. Referring to FIG. 2, the terminal unit 4 has an electronic mail tool 41 and a chat tool 42. Since the other components are the same as those of the structure shown in FIG. 1, the same components are given the same reference numerals and description of the same components is omitted here. The electronic mail tool 41 establishes the logical connection between the terminal unit 4 and the electronic mail center 1. The chat tool 42 establishes the logical connection between the terminal unit 4 and the chat server 2. Information communication between the electronic mail center 1 and the chat server 2 is enabled.

Figure 3:
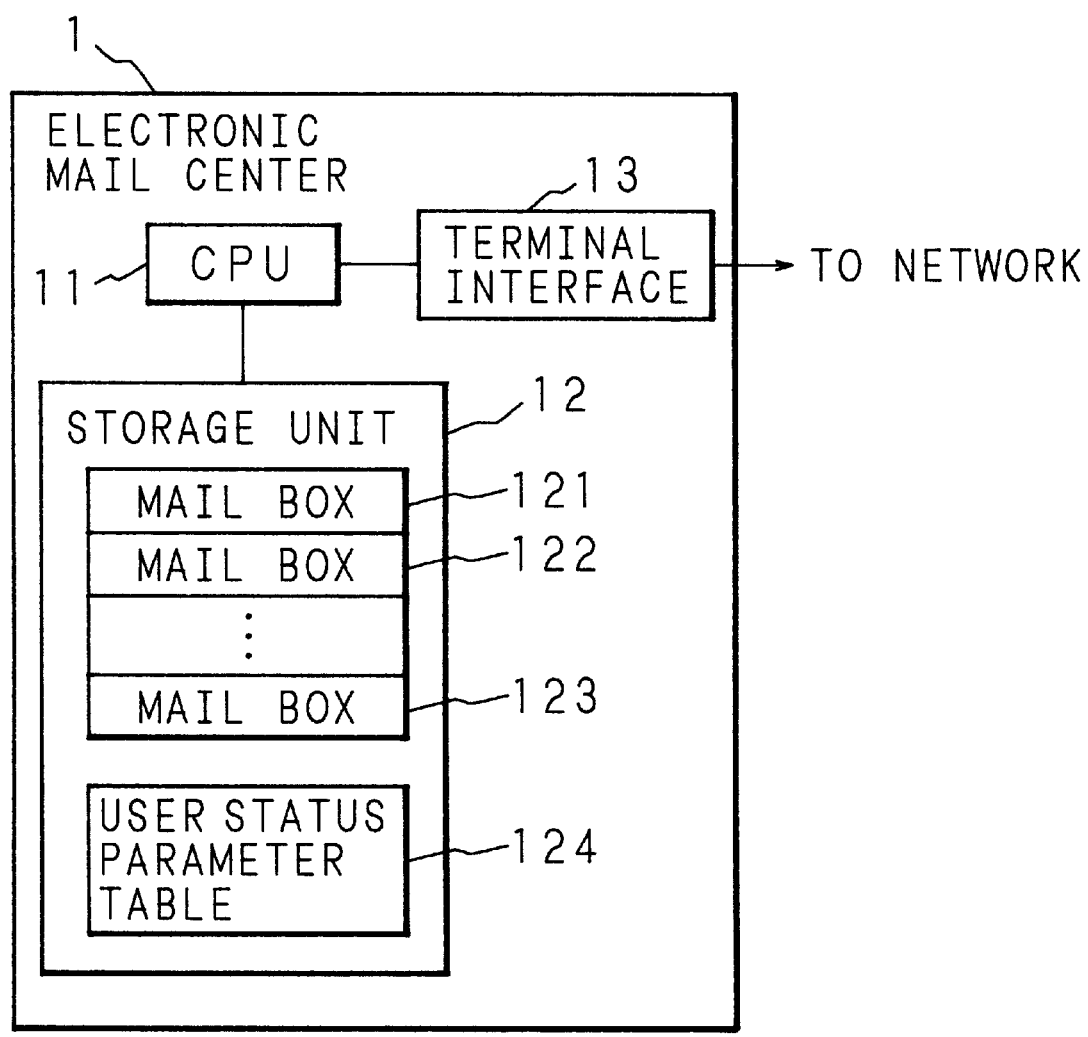
FIG. 3 is a block diagram of an electronic mail center.

FIG. 3 is a block diagram of the electronic mail center 1. A CPU 11 is connected to a storage unit 12 and a terminal interface 13. The storage unit 12 includes mail boxes 121, 122 and 123 corresponding to users who are receivers of electronic mail. Moreover, the storage unit 12 has a user status parameter table 124 for indicating instructions issued from users to the electronic mail center 1 and results of execution of the instructions. The terminal interface 13 permits communication of information among the terminal units 4, 5 and 6, the chat server 2 and the CPU 11 of the electronic mail center 1.

Figure 4:
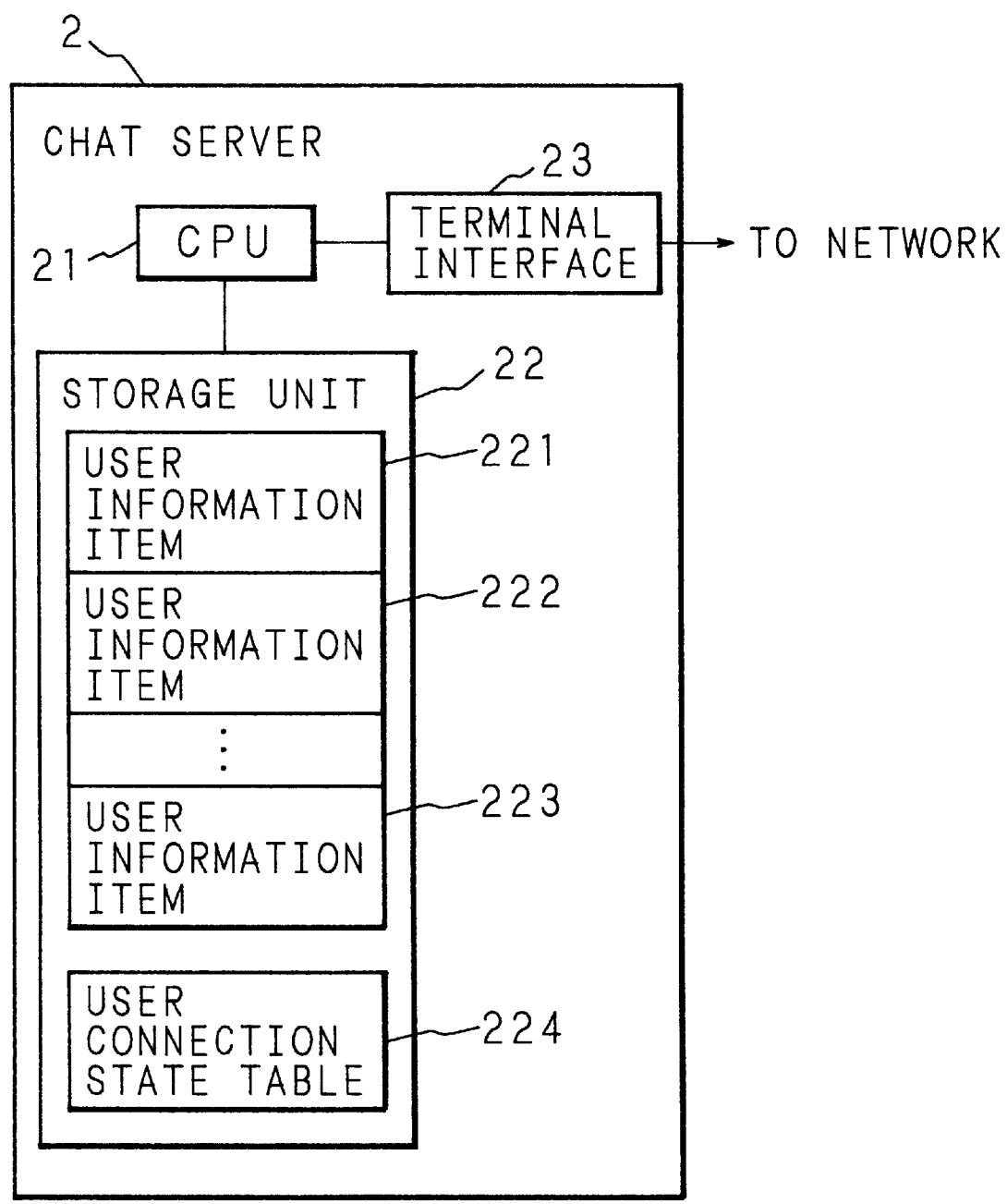
FIG. 4 is a block diagram of a chat server.

FIG. 4 is a block diagram showing the chat server 2. Referring to FIG. 4, a CPU 21 is connected to a storage unit 22 and a terminal interface 23. The storage unit 22 has user information items 221, 222 and 223, as shown in Table 1 mentioned below, in order to identify users and detect keywords respectively provided for users. Moreover, the storage unit 22 has a user connection state table 224 for indicating users who are participants of the chat which is being performed. The terminal interface 23 permits communication of information among the terminal units 4, 5, and 6, the electronic mail center 1 and the CPU 21 of the chat server 2.

FIG. 5 is an explanatory diagram of an example of the electronic mail. As shown in FIG. 5, the composition of the electronic mail includes a "From:" field indicating a sender of the electronic mail. A "To:" field indicates a receiver of the electronic mail (in a case where a plurality of receivers are indicated, the electronic mail addresses are punctuated by commas and continuously drawn). A "Message-ID:" field indicates the ID of the electronic mail. A "Date:" field indicates the date of receipt. The electronic mail center 1 is able to make reference to all of the information items written in the fields above.

Figure 7:
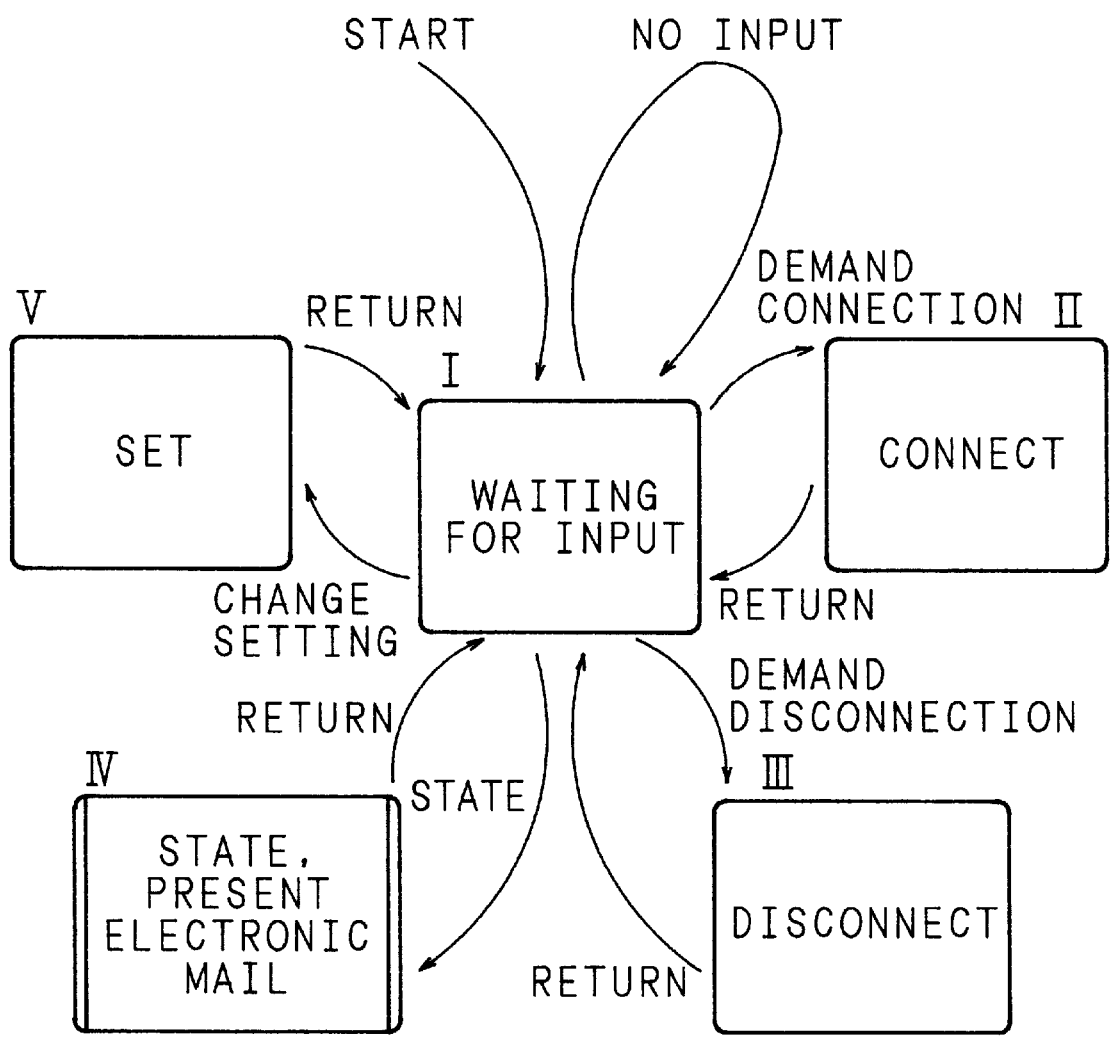
FIG. 7 is a status transition drawing for the chat server.

FIG. 7 is a state transition diagram of the chat server 2. The chat server 2 is usually in STATE I in which input from a user is awaited. When the chat server 2 receives a demand for connection from a user, the state is changed to STATE II in which a connecting process is performed. In STATE II, the connection is established only when the user who issued the demand for connection is a user registered as a member of the electronic mail service. Then, the User ID and the Terminal ID are registered to the user connection state table 224. If the registration is completed or if the user who issued the demand for the connection is not the registered user, the state is shifted to STATE I. When the chat server 2 receives a demand for disconnection from a user while in STATE I, the state is shifted to STATE III in which a disconnecting process is performed. In STATE III the User ID and the Terminal ID of the user who issued the demand for disconnection are deleted from the user connection state table 224. After deletion is completed, the state is shifted to STATE I. When a statement from a user is received in STATE I, the state is shifted to STATE IV in which a statement and electronic mail presentation process is performed. In STATE IV the received statement is transferred to all of the participants of the chat. In a case of searching for a trigger keyword to be detected or in a case of searching for a selection keyword to be detected, a demand for presentation of the electronic mail is issued to the electronic mail center 1.

When the selection keyword is detected, after the issue of the demand for presentation is completed, the state is shifted to STATE I. In other cases, the state is shifted to STATE I after the transfer is completed. When a change of setting is received in STATE I, the state is shifted to STATE V in which a setting process is performed. In STATE V the received change of setting is applied to the user information items 221, 222 and 223. That is, the trigger keyword and the selection keyword are set. After setting is completed, the state is shifted to STATE I.

Figure 8:
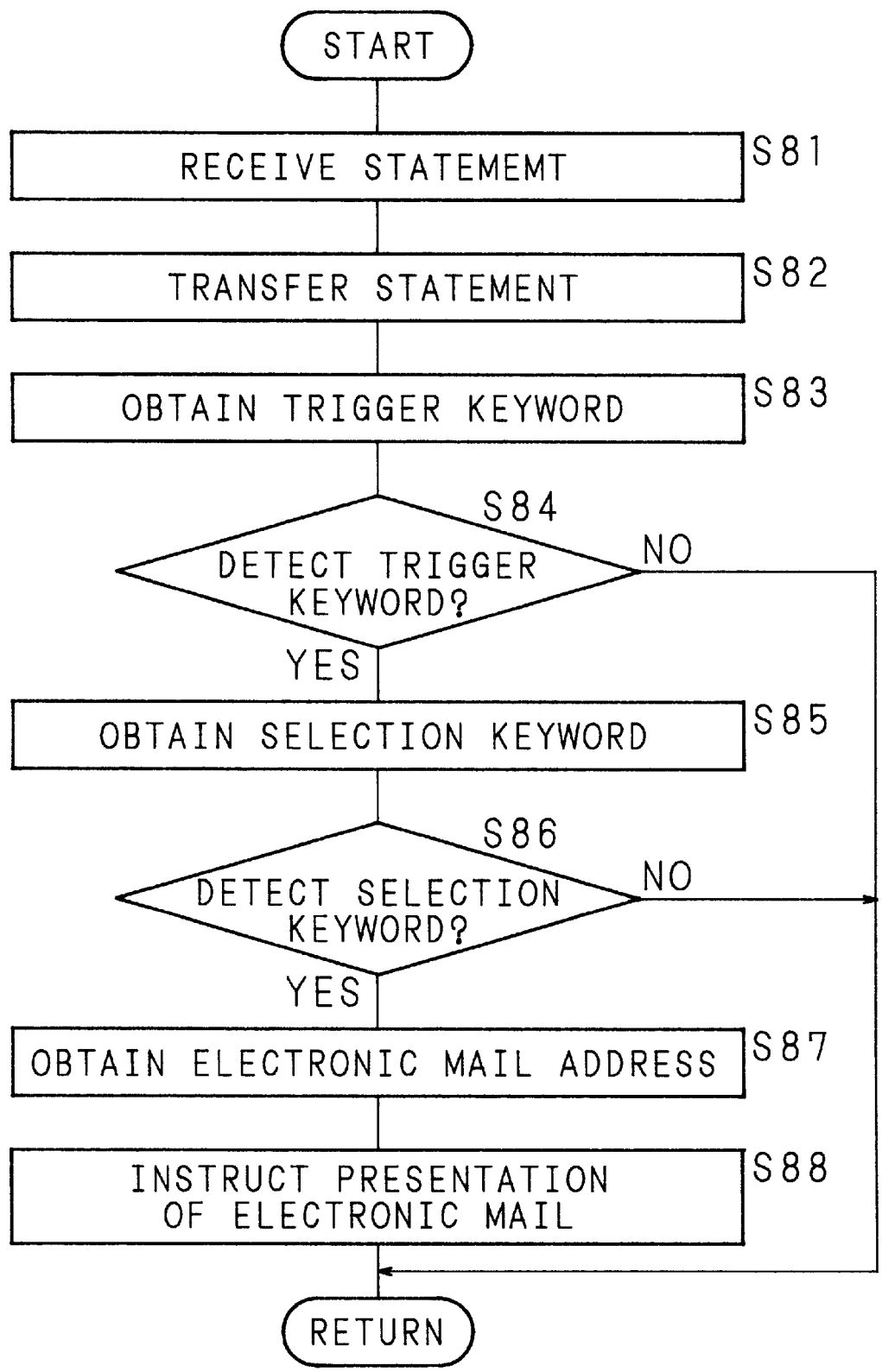
FIG. 8 is a flow chart showing a procedure in the chat server.

FIG. 8 is a flow chart, showing a procedure to be performed in STATE IV of the chat server 2. A statement from a user is received (S81), and then the contents of the statement are transferred to all of the participants (S82). Then, a trigger keyword is obtained from a user information item 221 of the user from which the statement was received (the "submitting user") (S83), and then the contents of the statement are searched for the trigger keyword (S84). When the trigger keyword is detected, a selection keyword is obtained from the user information item 221 of the submitting user (S85). Then the contents of the statement are searched for the selection keyword (S86). If the selection keyword is detected, the electronic mail addresses of the participants of the chat are obtained (S87). Then, the electronic mail address and a method of selecting the electronic mail are designated and an instruction is issued to the electronic mail center 1 to present the electronic mail (S88). The selection method may include not only an indirect instruction, such as for the latest electronic mail, i.e., whose receipt data is the newest, but also a direct instruction with the ID of the electronic mail.

Figure 9:
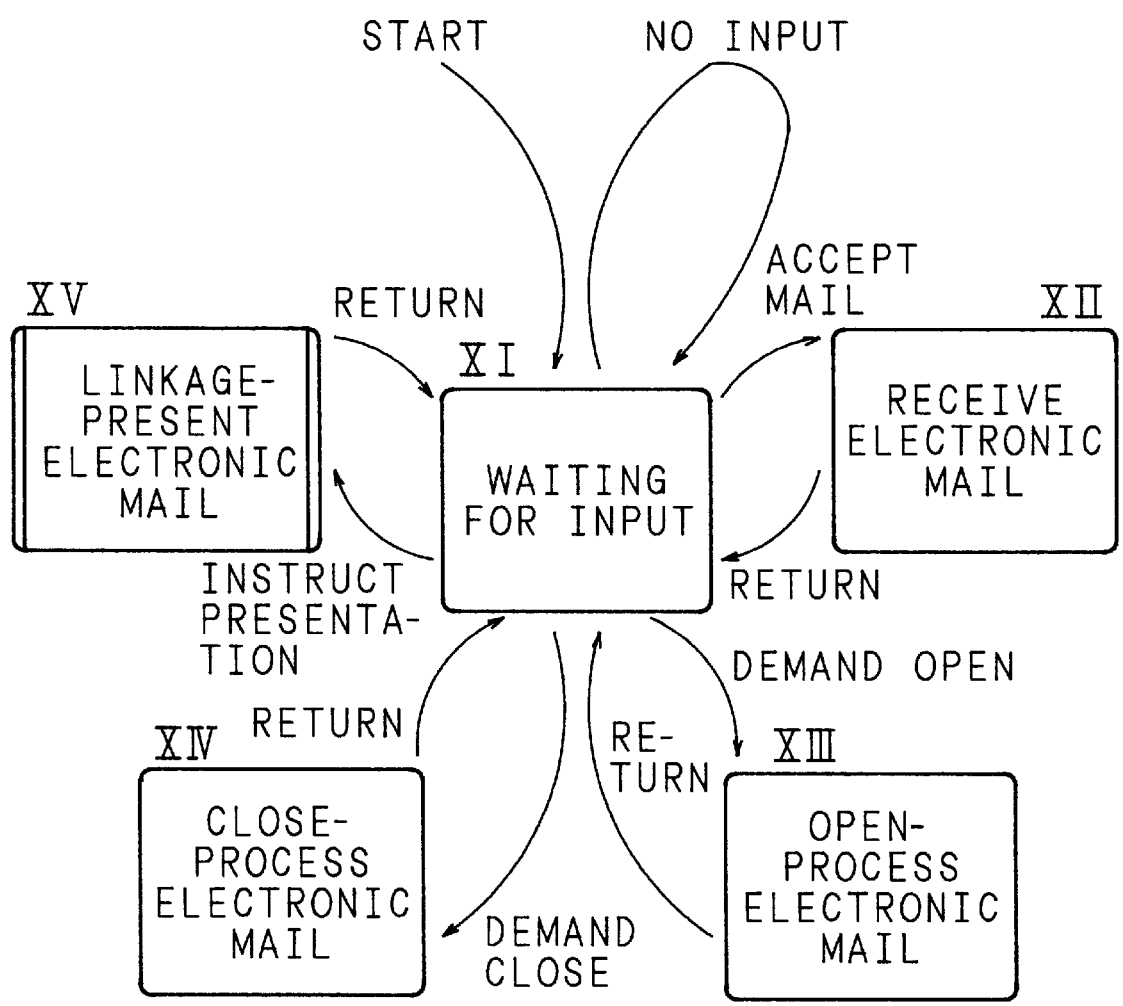
FIG. 9 is a status transition drawing for the electronic mail center.

FIG. 9 is a state transition diagram of the electronic mail center 1. The state of the electronic mail center 1 is ordinarily in STATE XI in which input from the chat server 2 is awaited. When the electronic mail center 1 receives an electronic mail from a user, the state is shifted to STATE XII in which an electronic mail receiving process is performed. In STATE XII the received electronic mail is stored in a mail box 121 of a designated user. After receipt is completed, the state is shifted to STATE XI. When an OPEN demand is received from the user in STATE XI, the state is shifted to STATE XIII in which an electronic mail OPEN process is performed. In STATE XIII an electronic mail designated by the user is selected from the mail box 121 of the user to be presented at the terminal unit of the user. Moreover, the fact that the electronic mail is in the OPEN state is written in the user status parameter table 124. The state is shifted to STATE XI after completing the OPEN process. When a CLOSE demand from the user is received in STATE XI, the state is shifted to STATE XIV in which an electronic mail CLOSE process is performed. In STATE XIV the fact that the electronic mail is in the CLOSE state is written in the user status parameter table 124. After the CLOSE process is completed, the state is shifted to STATE XI.

When a presentation command is received from the chat server 2 in STATE XI, the state is shifted to STATE XV in which an electronic mail linkage presentation process is performed. In STATE XV an electronic mail to be presented is selected in accordance with the electronic mail address or the method of selecting the electronic mail supplied from the chat server 2 so as to present the electronic mail to the sender of the electronic mail and the receiver, or common receivers. After the presentation is completed, the state is shifted to STATE XI.

Figure 10:
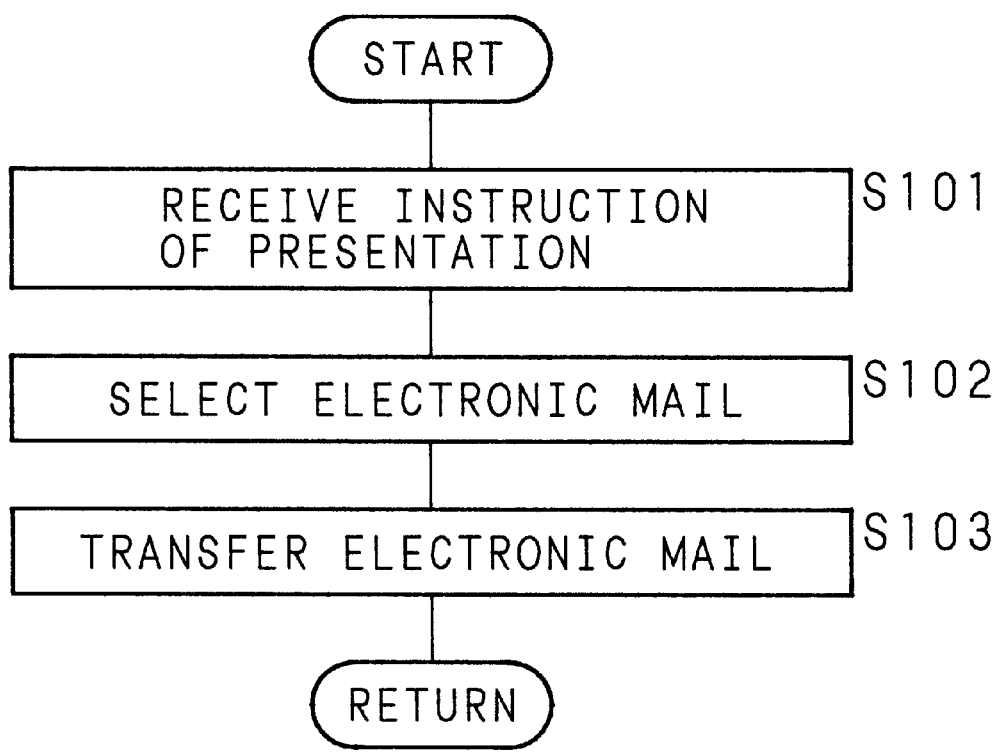
FIG. 10 is a flow chart showing a procedure in the electronic mail center.

FIG. 10 is a flow chart showing a procedure in STATE XV of the electronic mail center 1. An instruction for presentation is received from the chat server 2 (S101), and then an electronic mail to be presented is selected in accordance with the electronic mail address or the method of selecting the electronic mail included in the contents of the received instruction (S102). Then, the electronic mail is read from the mail box or boxes 121 (or 121, 122, 123) of the sender of the electronic mail, the receiver or common receivers, so as to present the electronic mails to the terminal unit or units 4 (or 4, 5, 6) of the respective users (S103).

Table 1 shows an example of user information for detecting a keyword determined for each user in the chat server 2. Referring to Table 1, user ID is an identifier for use in place of the name of each user. A user information item 221 (222, 223) includes, in addition to the user ID, items of the family name and first name of the user, the electronic mail address, nickname, and messages. That is, such messages provide the trigger keyword which serves as a trigger for the presentation of the electronic mail and the selection keyword which designates the latest electronic mail. The trigger keyword (including a keyword and a first keyword) and the selection keyword (including second and third keywords) are arbitrarily set for each user.

Table 1

Table 2 is an example of a user connection state table 224 of the chat server 2, showing users who are the participants of the chat. Referring to Table 2, terminal ID is used to identify a terminal unit 4 (5, 6) at the terminal interface 23 of the chat server 2. The terminal ID corresponds to the user ID.

Table 2

Operating procedures for the method of displaying electronic mail, the information communication system, the electronic mail center 1 and the chat server 2 will now be described with reference to FIG. 6.

Figure 6:
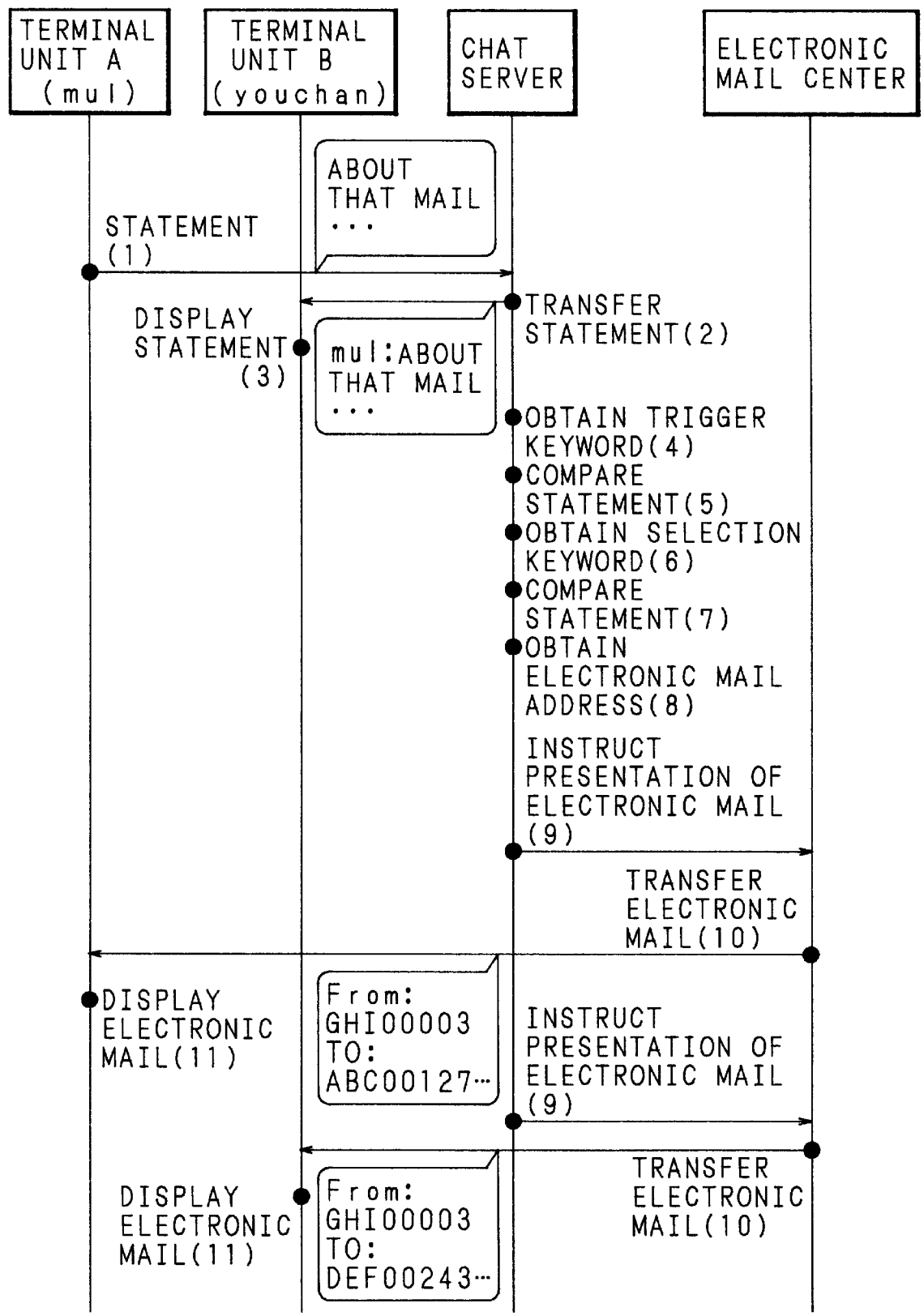
FIG. 6 is a timing chart for the information communication apparatus according to the present invention.

FIG. 6 is a timing chart showing a chat state according to the present invention. In FIG. 6, a person mul, using a terminal unit A, and a person youchan, using a terminal unit B, are chatting with each other through the information communication system according to the present invention. Assumptions have been made that mul and youchan have received electronic mails having the same contents from the same user. Also, it is assumed that the submitting user mul knows that the receiving user youchan has received the foregoing electronic mail.

(1) Mul uses the chat tool 42 of the terminal unit A to submit the statement, "May I ask you a question about that mail?"

(2) The chat server 2 receives the statement of mul, and then transfers the received statement while adding the user ID of the submitting user to the terminal units (only the terminal unit B in this case) of all of the users who are participating in the chat.

(3) The terminal unit B displays the received statement.

(4) The chat server 2 transfers the statement, and then analyzes the contents of the statement. To perform this analysis, the chat server 2 obtains the trigger keyword of the submitting user, that is, of mul, from the user information item 221.

(5) The trigger keyword of mul and the contents of the statement are subjected to a comparison. In a case where a plurality of trigger keywords are set, the trigger keywords are sequentially fetched one by one to be compared. In this case, the trigger keyword "about the mail" is detected.

(6) If the trigger keyword is included, a selection keyword is obtained from the user information item 221.

(7) The selection keyword of mul and the contents of the statement are subjected to a comparison. If a plurality of selection keywords are set, the plural selection keywords are sequentially fetched one by one to be compared. In this case, the selection keyword "the latest" is detected.

(8) Since both of the trigger keyword and selection keyword are detected, users (mul and youchan) who are being connected are identified from the user connection state table 224 in order to present the electronic mail to the users (in this case, only mul and youchan) who are the participants of the chat. Then their electronic mail addresses are obtained.

(9) The chat server 2 issues an instruction to the electronic mail center 1 to present the latest electronic mail received by mul (ABC00129) on the terminal unit (terminal unit A) of mul and the terminal unit (terminal unit B) of youchan.

(10) The electronic mail center 1, which receives the instruction to present the electronic mail, specifies and reads, from the mail box 121 of mul, the latest of the received electronic mails to transfer the read electronic mail to the terminal unit A of mul. Moreover, the electronic mail center 1 reads the electronic mail having the same ID from the mail box 122 of youchan, so as to transfer the read electronic mail to the terminal unit B of youchan.

(11) The terminal units A and B display the received electronic mails. Note that the latest electronic mail received in step (10) may be replaced by a latest electronic mail which has been transmitted.

In place of the term "latest" used as the selection keyword of the user information item 221 (222, 223), a character string in the form of "*-th day and *-th month" may be set. In this way, it is possible to present the electronic mail transmitted on the specified day to the terminal units of mul and youchan when the trigger keyword is detected in step (5) and the character string of the foregoing form (a fourth keyword) is detected in step (7).

In place of the term "latest" used as the selection keyword of the user information item 221 (222, 223), a character string in the form of "* days before" may be set. Thereby, it is possible to calculate the date of receipt of the electronic mail from a calendar included in the chat server 2 and to present the electronic mail received on the specified (i.e., calculated) day to the terminal units of mul and youchan when the trigger keyword is detected in step (5) and the character string of the foregoing form is detected in step (7).

As the selection keyword, IDs of any of the electronic mails in the mail box of the submitting user may be set as the selection keyword. When the trigger keyword is detected in step (5) and one of the foregoing IDs is detected in step (7), the electronic mail having the ID may be presented.

When the trigger keyword is detected in step (5), the chat server 2 queries the electronic mail center 1 whether the submitting user (mul) has the electronic mail displayed on the terminal unit (terminal unit A) thereof. If a discernment is made that the electronic mail is being displayed, the fact that the electronic mail is being displayed, the ID of the electronic mail, the sender of the electronic mail and the receiver of the same are communicated to the chat server 2.

When the chat server 2 discerns that either the sender or the receiver of the electronic mail is the user (youchan) who received the statement, the chat server 2 may present the electronic mail on the terminal unit (terminal unit B) of the user (youchan).

In step (9) the latest electronic mail among the electronic mails received by mul and youchan may be displayed on both of the terminal units of mul and youchan.

In a case where a plurality of electronic mails exist to be presented, a list of the electronic mails may be displayed.

The nicknames or names of the participants of the chat may be set as the selection keywords. When the trigger keyword is detected in step (5) and the nickname or name is detected in step (7), the electronic mail address of the user is obtained. Thus, the electronic mail transmitted from the electronic mail address to the submitting user may be presented on the terminal units of the user who transmitted the electronic mail and the submitting user.

Figure 11:
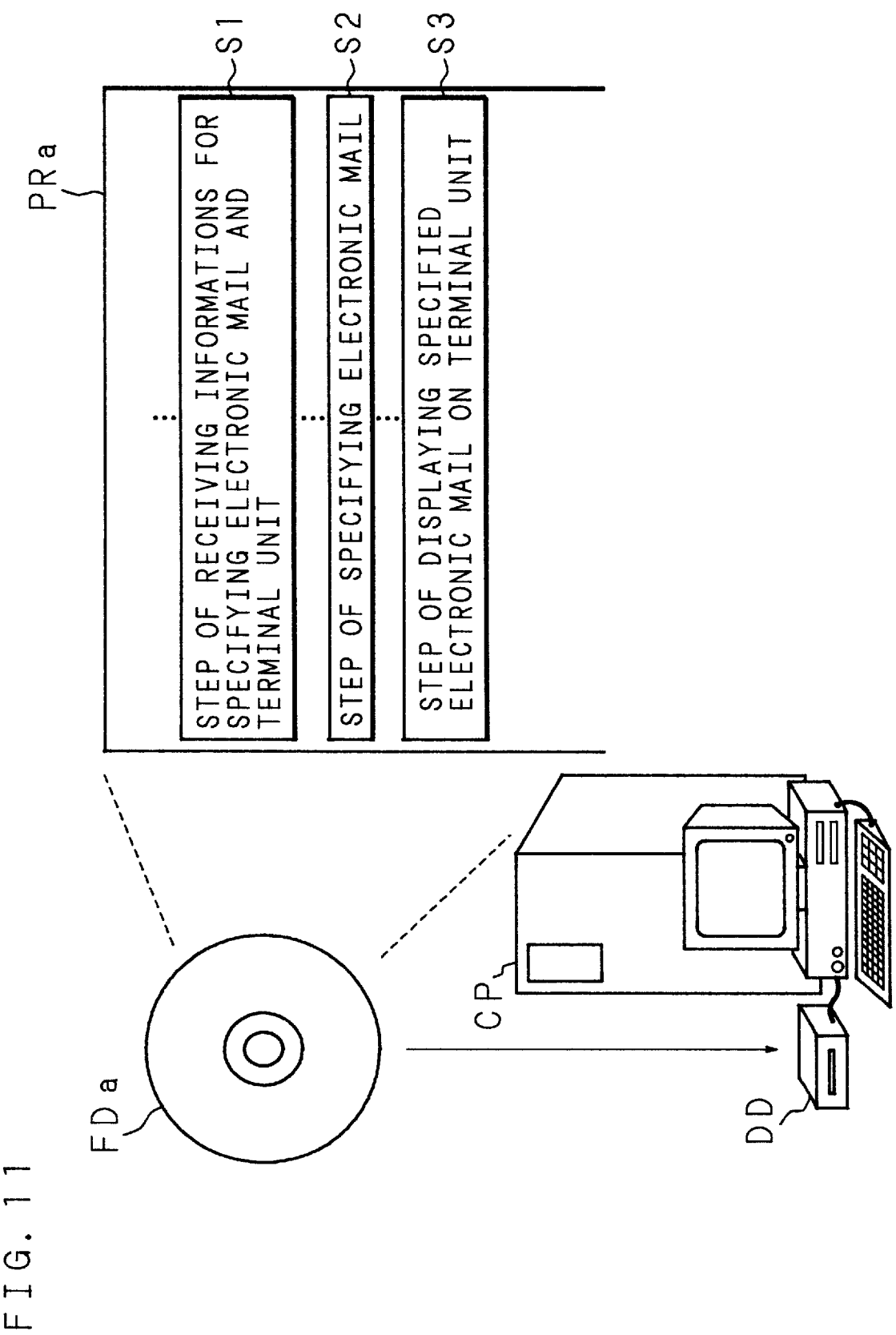
FIG. 11 is a diagram showing a recording medium according to a first embodiment of the present invention.

FIG. 11 is a diagram showing a recording medium according to a first embodiment of the present invention. The recording medium is illustrated in the form of a flexible disk FDa. A computer program PRa recorded on the flexible disk FDa has a step (S1) for receiving, from a chat server 2, an information for specifying an electronic mail and an information for specifying a terminal unit (4, 5, or 6) for displaying an electronic mail; a step (S2) for specifying the electronic mail in accordance with the information for specifying the electronic mail; and a step (S3) for reading the electronic mail from a mail box 121, 122 or 123 corresponding to the terminal unit 4, 5 or 6 specified in accordance with the information for specifying the terminal unit 4, 5, or 6 so as to display the electronic mail on the terminal unit 4, 5, or 6.

The flexible disk FDa is inserted into a disk drive DD. A computer CP controlled by the computer program PRa recorded on the flexible disk FDa acts as the foregoing electronic mail center 1. Since the structure and the operation of the electronic mail center 1 have been described, description thereof is omitted here.

Figure 12:
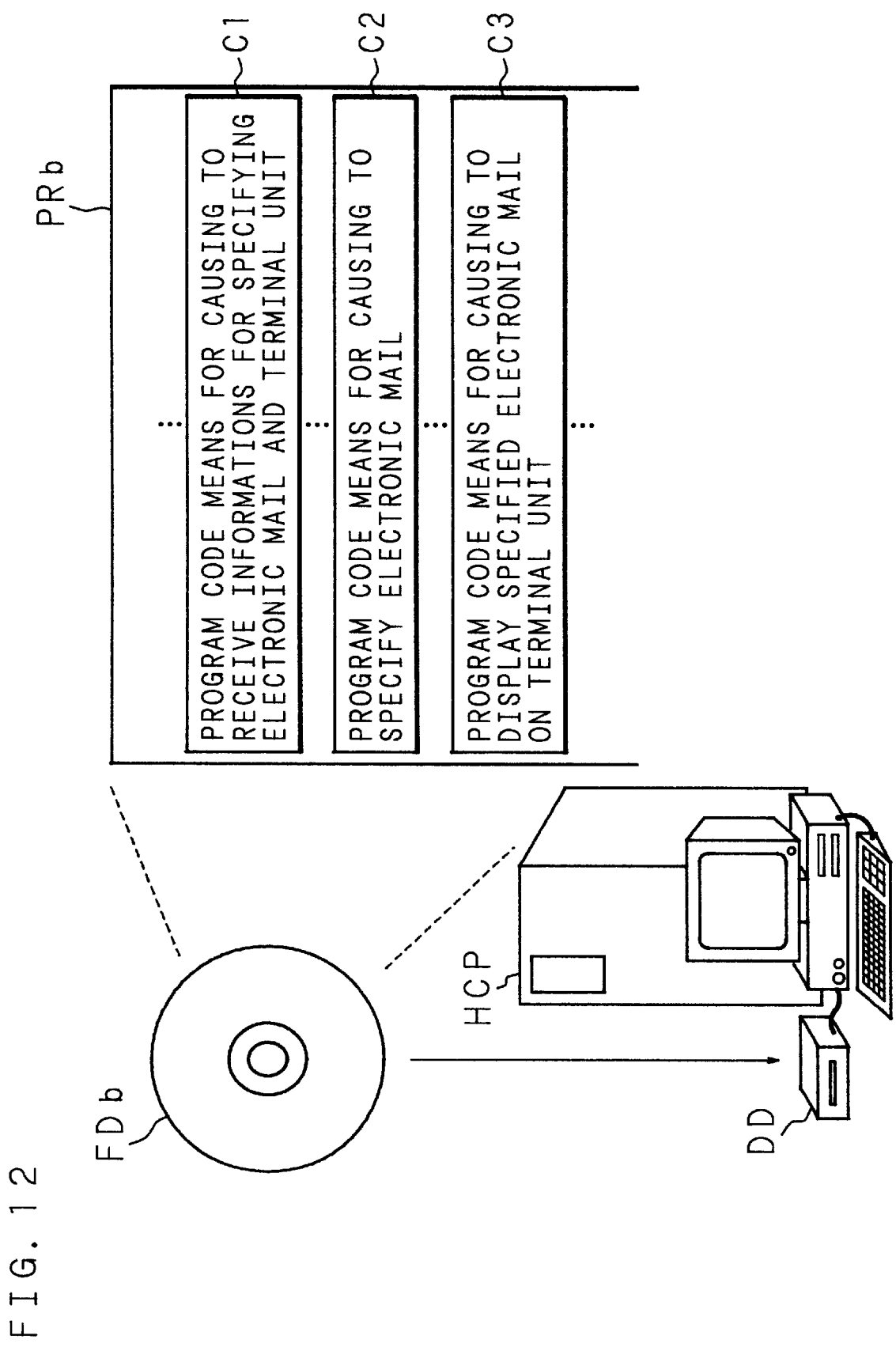
FIG. 12 is diagram showing a recording medium according to a second embodiment of the present invention.

FIG. 12 is a diagram showing a recording medium according to a second embodiment of the present invention. The recording medium according to this embodiment is illustrated in a form of a flexible disk FDb. A computer program PRb recorded on the flexible disk FDb has code means (C1) for a program for causing to receive all information for specifying an electronic mail and an information for specifying a terminal unit 4, 5 or 6 for displaying an electronic mail from the chat server 2. Program PRb further includes code means (C2) for a program for causing to specify the electronic mail in accordance with the information for specifying the electronic mail. Also included is code means (C3) for a program for causing to read the electronic mail from a mail box 121, 122 or 123 corresponding to the terminal unit 4, 5 or 6 specified in accordance with the information for specifying the terminal unit 4, 5 or 6 and causing to display the electronic mail on the terminal unit, 4, 5 or 6.

The flexible disk FDb is inserted into a disk drive DD. A host computer HCP controlled by the computer program PRb recorded on the flexible disk FDb acts as the foregoing electronic mail center 1. Since the structure and the operation of the electronic mail center 1 have been described, description thereof is omitted here.

Figure 13:
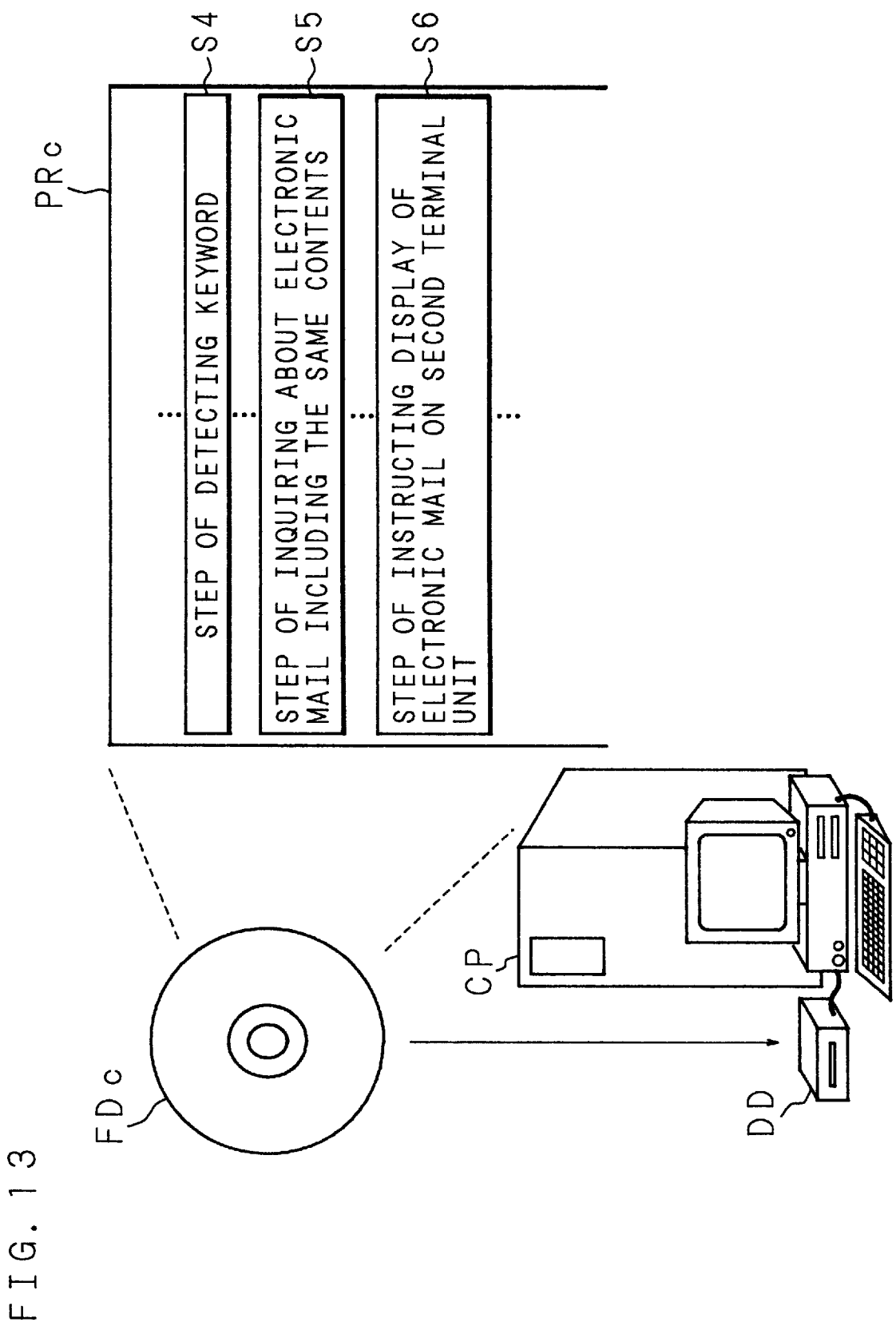
FIG. 13 is a diagram showing a recording medium according to a third embodiment of the present invention.

FIG. 13 is a diagram showing a recording medium according to a third embodiment of the present invention. The recording medium according to this embodiment is illustrated in a form of a flexible disk FDc. A computer program PRc recorded on the flexible disk FDc has a step (S4) for searching a message received from a first terminal unit for a predetermined keyword. Also included is a step (S5) for inquiring an electronic mail center 1 about electronic mails having the same contents stored in mail boxes 121, 122 respectively corresponding to the first terminal unit 4 and a second terminal unit 5 specified in accordance with a user information item 222, if the keyword is detected. Further, program PRc has a step (S6) for issuing an instruction to read the electronic mail from the mail box 122 corresponding to the second terminal unit 5 so as to display the electronic mail on the second terminal unit 5.

The flexible disk FDc is inserted into a disk drive DD. A computer CP controlled by the computer program PRc recorded on the flexible disk FDc acts as the foregoing chat server 2. Since the structure and the operation of the chat server 2 have been described, description thereof is omitted here.

Figure 14:
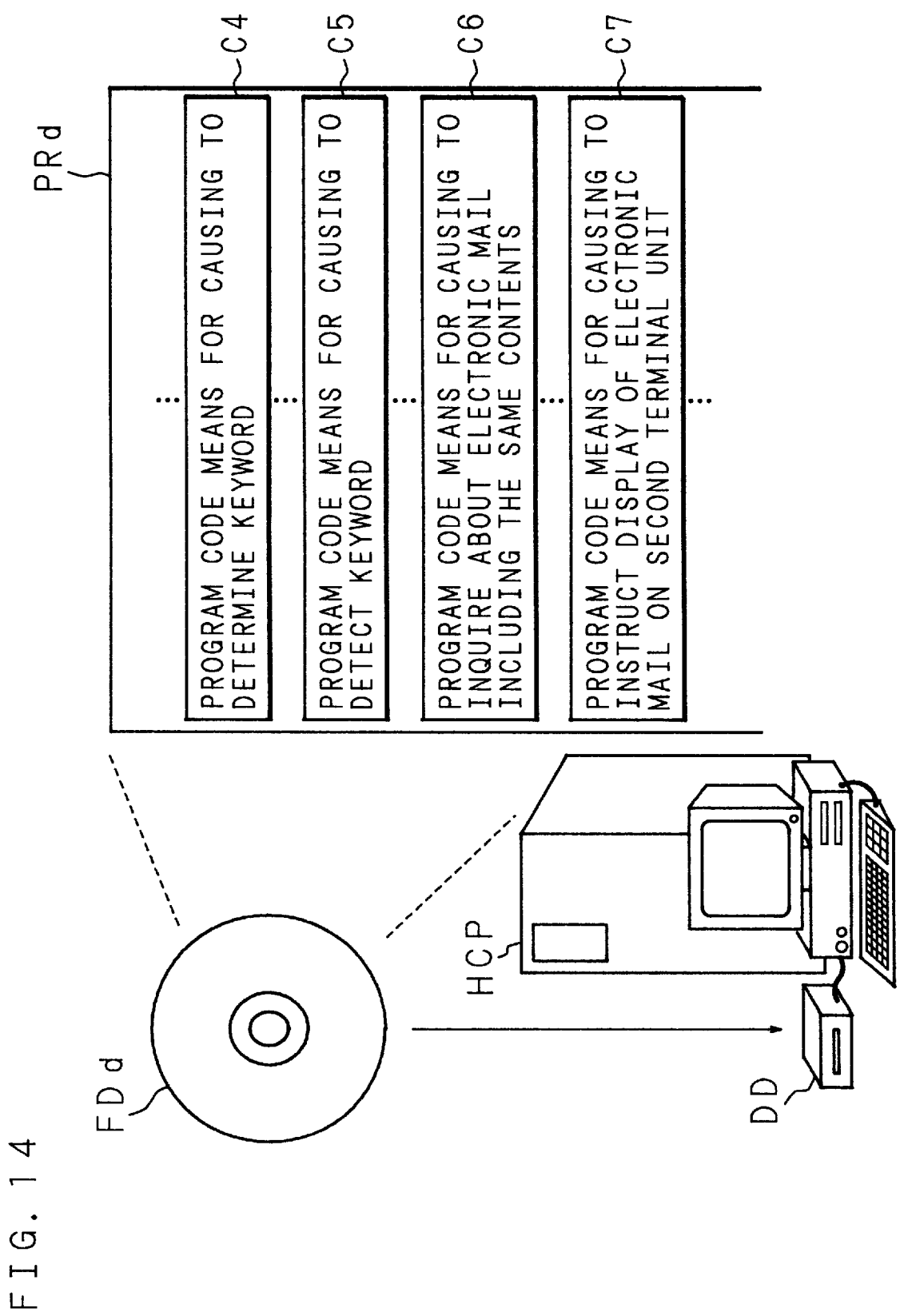
FIG. 14 is a diagram showing a recording medium according to a fourth embodiment of the present invention.

FIG. 14 is a diagram showing a recording medium according to a fourth embodiment of the present invention. The recording medium is illustrated in a form of a flexible disk FDd. A computer program PRd recorded on the flexible disk FDd has code means (C4) for a program for causing to determine a keyword. Program PRd also has code means (C5) for a program for causing to search a message received from a first terminal unit 4 for the keyword. Program PRd further has code means (C6) for a program for causing to inquire an electronic mail center 1 about electronic mails having the same contents stored in mail boxes 121, 122 respectively corresponding to the first terminal unit 4 and a second terminal unit 5 specified in accordance with a user information item 222, if the keyword is detected. Program PRd still further has code means (C7) for a program for causing to issue an instruction to read the electronic mail from the mail box 122 corresponding to the second terminal unit 5 so as to display the electronic mail on the second terminal unit 5.

The flexible disk FDd is inserted into a disk drive DD. A host computer HCP controlled by the computer program PRd recorded on the flexible disk FDd acts as the foregoing chat server 2. Since the structure and the operation of the chat server 2 have been described, description of the chat server 2 is omitted here.

Figure 15:
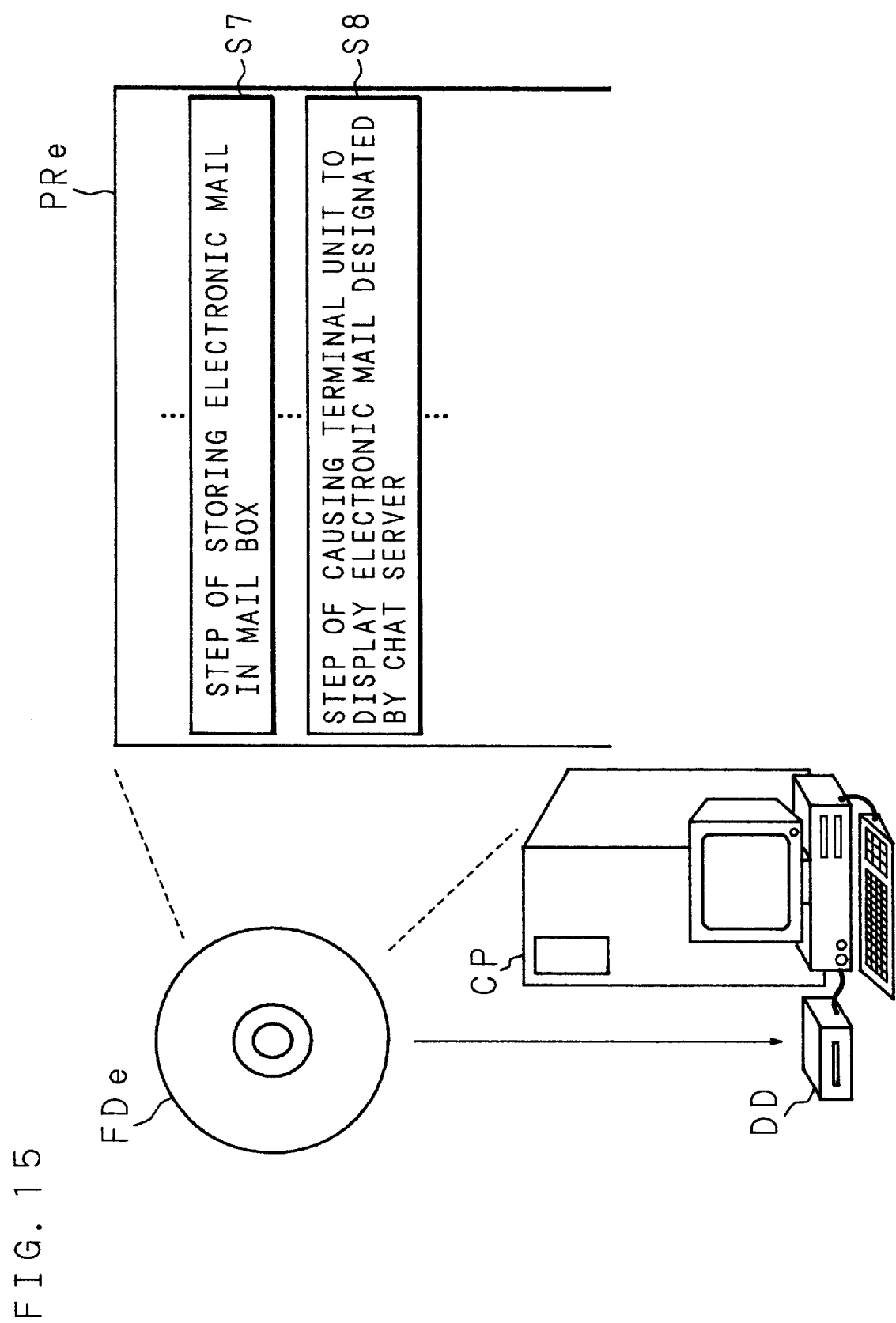
FIG. 15 is a diagram showing a recording medium according to a fifth embodiment of the present invention.

FIG. 15 is a diagram showing a recording medium according to a fifth embodiment of the present invention. The recording medium according to this embodiment is illustrated in a form of flexible disk FDe. A computer program PRe recorded on the flexible disk FDe has a step (S7) for storing electronic mails transmitted and received by users into mail boxes 121, 122, 123 corresponding to the users. A step (S8) is for causing the electronic mails in the mail boxes 121, 122, 123 of a plurality of users designated by a chat server 2, for controlling a character chat in which the plural users among all users are participating, to be displayed on the terminal units 4, 5, 6 respectively operated by the plural users.

The flexible disk FDe is inserted into a disk drive DD. A computer CP controlled by the computer program PRe recorded on the flexible disk FDe acts as the foregoing electronic mail center 1. Since the structure and the operation of the electronic mail center 1 have been described, description of the electronic mail center 1 is omitted here.

Figure 16A:
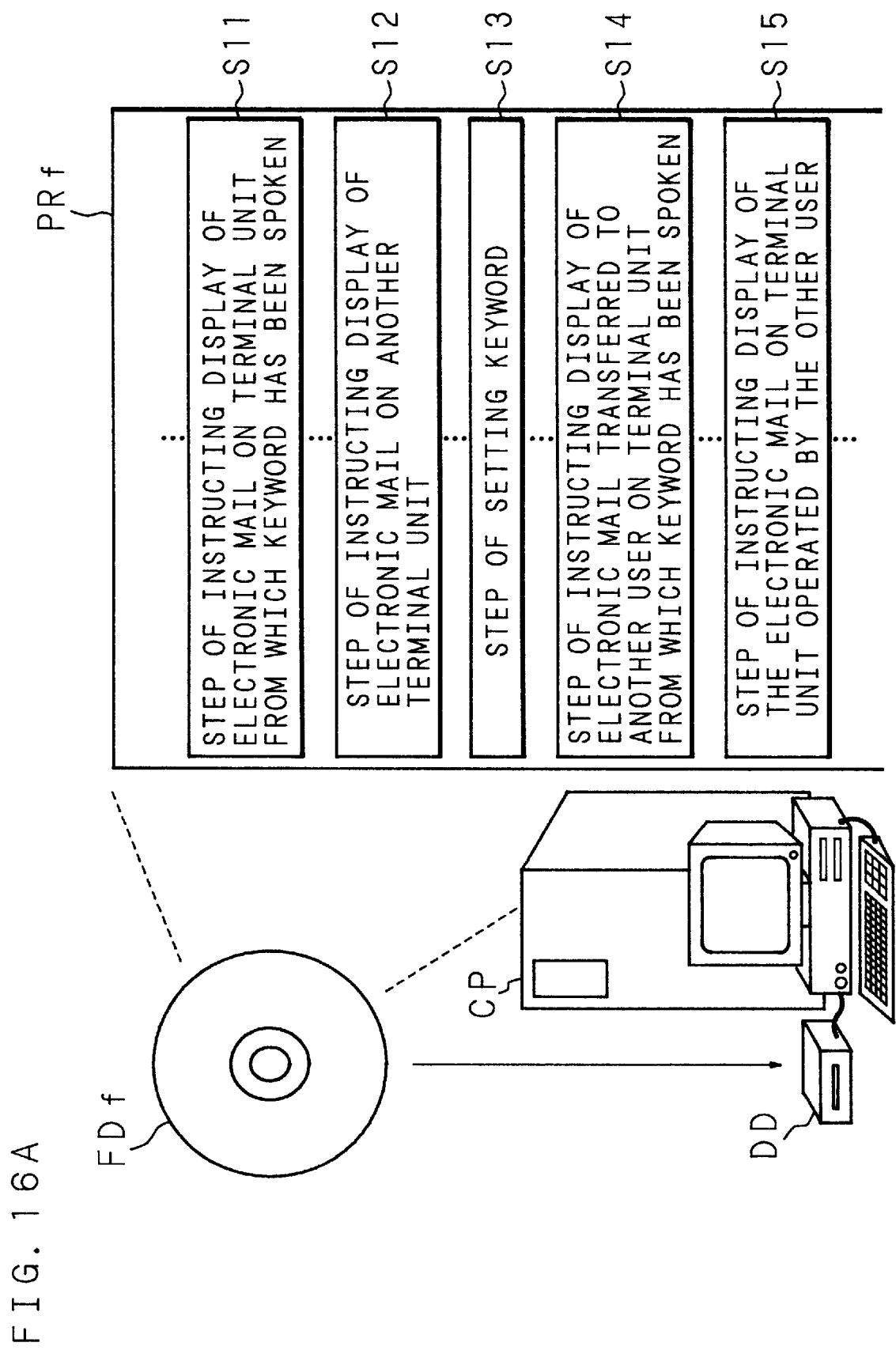
FIGS. 16A to 16C are diagrams showing portions of a recording medium according to a sixth embodiment of the present invention.
Figure 16B:
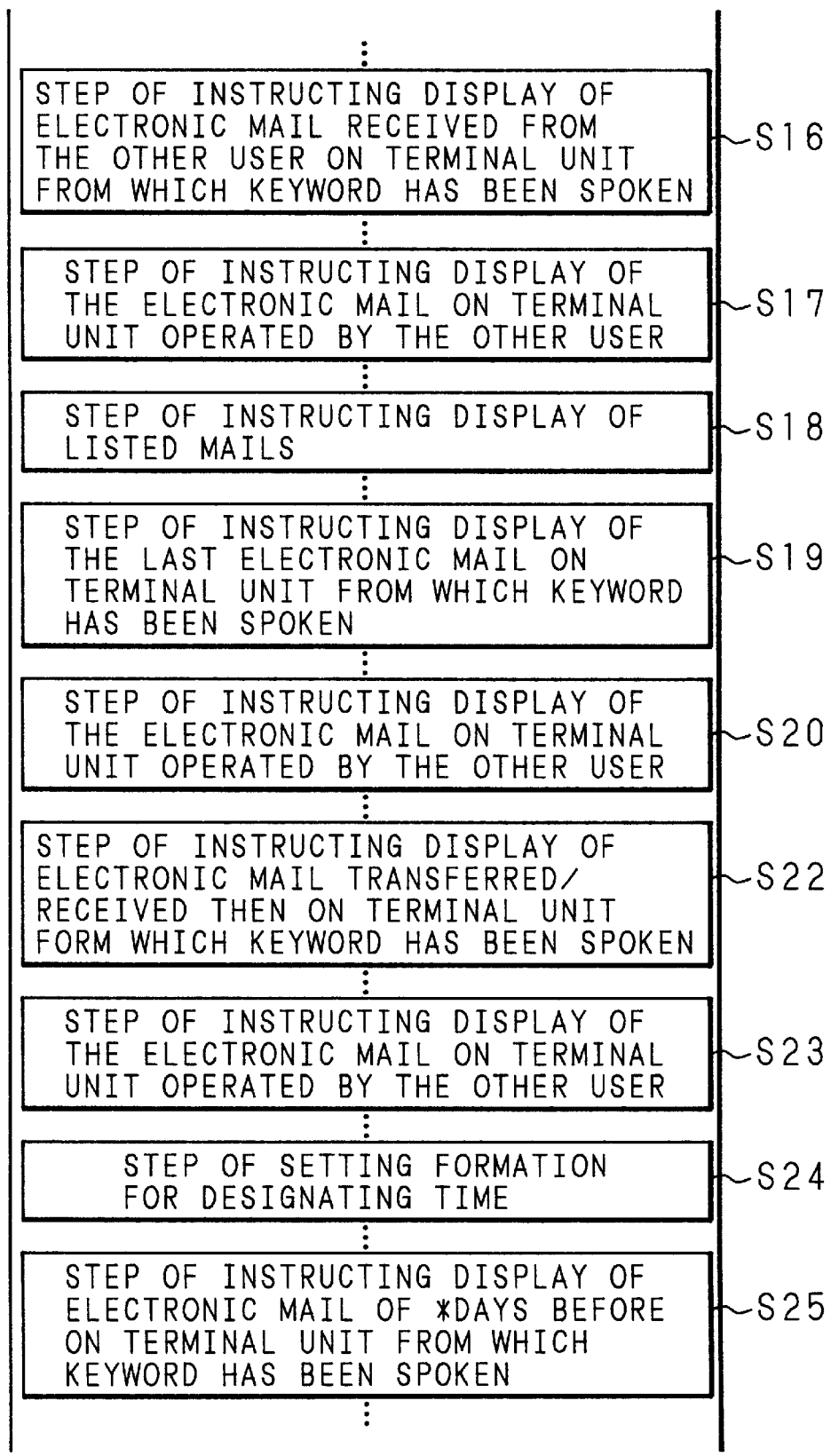
Figure 16C:
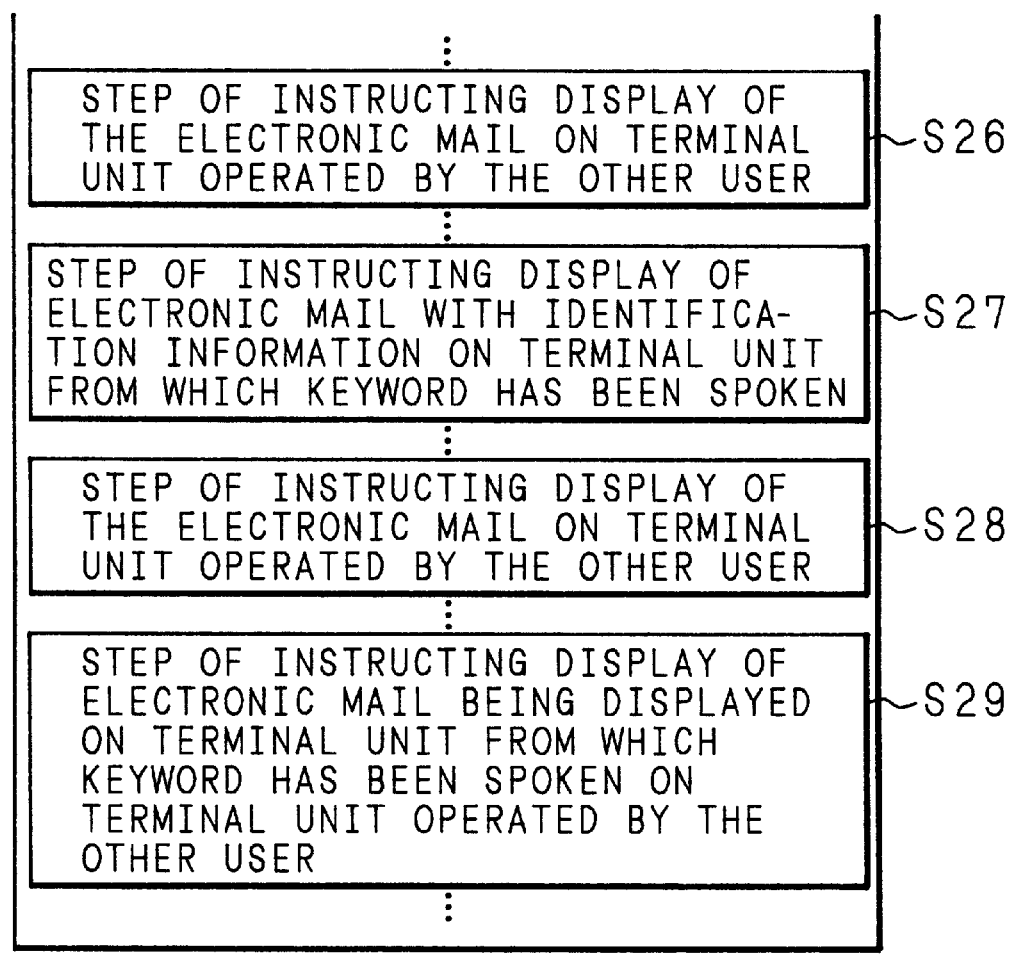

FIGS. 16A to 16C show portions of a recording medium according to a sixth embodiment of the present invention. The recording medium is illustrated in the form of flexible disk FDf. A computer program PRf recorded on the flexible disk FDf has a step (S11) for instructing display of electronic mails in respective mail boxes. This display is performed when a predetermined keyword is submitted during a character chat in a chat system to which a plurality of users participate who have respective mail boxes 121, 122, 123 in an electronic mail center 1 for storing transmitted and received electronic mails. In this display process, the electronic mails in the mall box 121 of the user who is operating a terminal unit 4 from which the keyword has been submitted are displayed on the terminal unit 4. A step (S12) is for instructing the electronic mail to be displayed on the terminal units 5, 6 being operated by the users who are participating in the character chat. These users have the mail boxes 122 and 123 in the electronic mail center 1, in which the electronic mails having the same contents as those of the above electronic mail are stored. A step (S13) is also included, in which keywords are set by users respectively.

Moreover, the computer program PRf has a step (S14) in which, in a case where two users participate in the chat, an instruction is issued to the electronic mail center 1 to display an electronic mail transmitted from one user to the other on the terminal 4. In this step, the sender of the electronic mail is the user operating the terminal unit 4 from which a predetermined keyword has been submitted and stored in the mail box 121. A step (S15) is for instructing to display an electronic mail having the same contents as those of the above electronic mail, stored in the mail box 122 of the other user on the terminal unit 5 which is being operated by the other user.

Moreover, the computer program PRf has a step (S16) in which, in a case where two users participate in the chat, an instruction is issued to the electronic mail center 1 to display on the terminal unit 4 an electronic mail received by one user from the other user. In this step, the receiving user operates the terminal unit 4 from which a predetermined keyword has been submitted and stored in the mail box 121. A step (S17) is for instructing to display an electronic mail having the same contents as those of the above electronic mail, stored in the mail box 122 of the other user on the terminal unit 5 which is being operated by the other user.

Moreover, the computer program PRf has a step (S18), in a case where a plurality of the electronic mails to be displayed on the terminal unit 4 (5, 6) are included in the mail box 121 (122, 123). Step S18 is for issuing an instruction to the electronic mail center 1 such that electronic mails are listed and displayed on the terminal unit 4 (5, 6).

Moreover, the computer program PRf has a step (S19), in which an instruction is issued when a statement including a predetermined keyword and a third keyword has been made (i.e., submitted) in a chat. This instruction is issued to the electronic mail center 1 to display the latest electronic mail in the mail box 121 of a user who is operating the terminal unit 4 from which the statement has been made. A step (S20) is for displaying, on the terminal unit 5 which is being operated by another user, the electronic mail stored in the mail box 122 of the other user and which has the same contents as those of the above electronic mail. A step is also included in which third keywords are set by users respectively.

In a step (S22) of program PRf, when a statement including a predetermined keyword and a fourth keyword for designating time has been made in a chat, an instruction is issued to the electronic mail center 1 to display on the terminal unit 4 a transmitted or received electronic mail at that time in the mail box 121 of a user who is operating the terminal unit 4 from which the statement has been made. A step (S23) is for displaying, on a terminal unit 5 which is being operated by another user, the electronic mail which is stored in the mail box 122 of the other user and which has the same contents as the above electronic mail. A step (S24) is included in which the form for designating the time of fourth keywords are set by users respectively.

Moreover, the computer program PRf also has a step (S25). When a statement including a predetermined keyword and term "* days before" has been made in a chat, an instruction is issued at step S25 to the electronic mail center 1 to display on the terminal unit 4 an electronic mail transmitted * days before and stored in the mail box 121 of the user who is operating the terminal unit 4 from which the foregoing statement has been made. A step (S26) is for instructing to display the electronic mail which has the same contents as the above electronic mail, stored in the mail box 122 of another user on the terminal unit 5 which is being operated by the other user.

Moreover, the computer program PRf has a further step (S27), effective when identification information is added to an electronic mail to be transmitted from each of users and a statement including a predetermined keyword and the identification information above has been made. In step S27, an instruction is issued to the electronic mail center 1 to display on terminal unit 4 the electronic mail with the identification information which is stored in the mail box 121 of the user who operates the terminal unit 4 from which the statement has been made. A step (S28) is for instructing to display the same electronic mail as the electronic mail, stored in the mail box 122 of the other user, on the terminal unit 5 which is being operated by the other user.

Moreover, the computer program PRf has a step (S29) operative when a predetermined keyword has been submitted in a chat, and in a case where an electronic mail has been displayed on the terminal unit 4 from which the keyword has been submitted. In step S29, an instruction is issued to the electronic mail center 1 to display on terminal unit 5 the electronic mail which is stored in the mail box 122 of the other user and which is the same as the electronic mail. The terminal unit 5 is being operated by the other user.

The flexible disk FDf is inserted into a disk drive DD. A computer CP controlled by the computer program PRf recorded on the flexible disk FDf acts as the chat server 2. Since the structure and the operation of the chat server 2 have been described, description of the chat server 2 is omitted here.

Although the foregoing embodiments have been described to comprise the recording medium which is any one of the flexible disks FDa to FDf, the present invention is not limited to the flexible disk. For example, the recording medium may be an optical disk, a magnetic tape, a CD-ROM or the like.

As described above, the electronic mail and the chat system, which have been used independently of each other as opinion communication means, are linked to each other so as to communicate opinions more smoothly.

As this invention may be embodied in several forms without departing from the spirit of essential characteristics thereof, the present embodiments are therefore illustrative and not restrictive, since the scope of the invention is defined by the appended claims rather than by the description preceding them. All changes that fall within metes and bounds of the claims or equivalence of such metes and bounds thereof are therefore intended to be embraced by the claims.

TABLE 1

| USER ID | FAMILY NAME | FIRST NAME | ELECTRONIC MAIL ADDRESS | NICKNAME | TRIGGER KEYWORD | SELECTION KEYWORD |
|---|---|---|---|---|---|---|
| mul | MURAKAMI | MASAHIKO | ABC00127 | mul | meiru no ken dakedo<br>meiru no key yakedo<br>meiru yakedosa<br>(about the mail)<br>[End of Data] | sakihodono<br>imasakkino<br>(the latest)<br>[End Of Data] |
| youchan | WATNABE | YOUICHI | DEF00243 | youchan | meiru no ken dakedo<br>meiru ni tsuite<br>(about the mail)<br>[End Of Data] | sakkino<br>konaidano<br>(the latest)<br>[End Of Data] |
| natsuki | SUGIHARA | NATSUKI | CHI00003 | natsukichi | meiru no ken desuga<br>(about the mail)<br>[End Of Data] | imano<br>(the latest)<br>[End Of Data] |

...

[End Of Data]

TALE 2

| USER ID | TERMINAL DEVICE ID |
|---|---|
| mul | TERMINAL DEVICE 4 |
| youchan | TERMINAL DEVICE 5 |
| ... | |
| [End Of Data] | |

I claim:

1. An electronic mail display method, comprising the steps of:

determining a first keyword for instructing display of electronic mails, respectively stored in a plurality of mail boxes provided to correspond to users, on terminal units corresponding to the mail boxes;

searching a message transmitted from a first terminal unit for the first keyword;

searching the message for a user information for specifying a terminal unit;

specifying and reading a corresponding electronic mail from among electronic mails stored in mail boxes corresponding to the first terminal unit and a second terminal unit specified in accordance with the user information when the first keyword is detected; and displaying the read electronic mail on the second terminal unit.

2. An electronic mail display method according to claim 1, further comprising the steps of:

determining a second keyword for specifying a latest electronic mail;

searching the message for the second keyword when the first keyword is detected; and specifying and reading a corresponding electronic mail from among electronic mails stored in the mail boxes corresponding to the first terminal unit and the second terminal unit when the second keyword is detected.

3. An electronic mail display method according to claim 2, wherein:

a keyword for indicating a date of receipt of electronic mail is set as the second keyword;

a date of receipt is found when the second keyword is detected; and an electronic mail received on the found date of receipt is, in the reading step, read from the mail box corresponding to the second terminal unit.

4. An electronic mail display method according to claim 2, wherein:

a keyword for indicating a specified number of days from a date of receipt of electronic mail to a current date is set as the second keyword;

the specified number of days is found when the second keyword is detected;

the date of receipt of electronic mail is obtained from the current date obtained from a calendar and the specified number of days; and an electronic mail received on the date of receipt is, in the reading step, read from the mail box corresponding to the second terminal unit.

5. An electronic mail display method according to claim 1, wherein each of a user information of a sender of the electronic mail to be read and a user information of a receiver of the same coincides with a user information of a user who submitted the message or a user information of a user who received the message.

6. An electronic mail display method according to claim 1, wherein the electronic mail to be read has a first user information of a user who submitted the message and a second user information of a user who received the same, the first and second user information indicating that the respective users received the electronic mail to be read.

7. An electronic mail display method according to claim 1, wherein the electronic mail to be read has either of a user information of a user who submitted the message or a user information of a user who received the message as the user information of a user who transmitted the electronic mail to be read, and another user information is designated as a user information of a user who received the electronic mail to be read.

8. An electronic mail display method according to claim 1, wherein when a plurality of electronic mails are to be read, a list of the plurality of electronic mails is displayed.

9. An electronic mail display method according to claim 1, wherein when the electronic mail to be read is displayed on the first terminal unit, the electronic mail is read from the mail box corresponding to the second terminal unit.

10. An electronic mail display method according to claim 1, further comprising the step of searching the message for an identification information of an electronic mail when the first keyword is detected; and wherein the electronic mail to be read is, in the reading step, read from the mail box corresponding to the second terminal unit when the identification information is detected.

11. An electronic mail display method, comprising the steps of:

determining a first keyword for instructing display of electronic mails, respectively stored in a plurality of mail boxes provided to correspond to users, on terminal units corresponding to the mail boxes;

searching a message transmitted from a first terminal unit for the first keyword;

specifying and reading a corresponding electronic mail from among electronic mails stored in a mail box corresponding to the first terminal unit when the first keyword is detected; and displaying the read electronic mail on the first terminal unit.

12. An electronic mail display method according to claim 11, further comprising the steps of:

determining a second keyword for specifying a latest electronic mail;

searching the message for the second keyword when the first keyword is detected; and specifying and reading a corresponding electronic mail from among electronic mails stored in the mail box corresponding to the first terminal unit when the second keyword is detected.

13. An electronic mail display method according to claim 12, wherein:

a keyword for indicating a date of receipt of electronic mail is set as the second keyword;

a date of receipt is found when the second keyword is detected; and an electronic mail received on the found date of receipt is, in the reading step, read from the mail box corresponding to the first terminal unit.

14. An electronic mail display method according to claim 12, wherein:

a keyword for indicating a specified number of days from a date of receipt of electronic mail to a current date is set as the second keyword;

the specified number of days is found when the second keyword is detected;

the date of receipt of electronic mail is obtained from the current date obtained from a calendar and the specified number of days; and an electronic mail received on the date of receipt is, in the reading step, read from the mail box corresponding to the first terminal unit.

15. An electronic mail display method according to claim 11, further comprising the step of searching the message for an identification information of an electronic mail when the first keyword is detected; and wherein the electronic mail to be read is, in the reading step, read from the mail box corresponding to the first terminal unit when the identification information is detected.

16. An information communication system, comprising:

means for receiving an electronic mail from a sending terminal unit;

means for storing the received electronic mail in an indicated mail box included in a plurality of mail boxes provided for electronic mail addresses;

means for setting a keyword for instructing display of an electronic mail corresponding thereto and stored in at least one of the mail boxes;

means for receiving a message from a first terminal unit;

means for identifying in the message a first user information corresponding to the first terminal unit;

means for searching the message for the keyword;

means for searching the message for a second user information corresponding to a second terminal unit;

means for transmitting the message to the second terminal unit together with the first user information;

means for, when the keyword is detected, specifying electronic mails having the same contents and commonly stored in mail boxes corresponding to the first terminal unit and the second terminal unit;

means for reading the specified electronic mail from the mail box corresponding to the second terminal unit; and means for causing the second terminal unit to display the read electronic mail.

17. An information communication system, comprising:

means for receiving an electronic mail from a sending terminal unit;

means for storing the received electronic mail in an indicated mail box included in a plurality of mail boxes provided for electronic mail addresses;

means for setting a keyword for instructing display of an electronic mail corresponding thereto and stored in at least one of the mail boxes;

means for receiving a message from a first terminal unit;

means for identifying in the message a user information corresponding to the first terminal unit;

means for transmitting the message to a second terminal unit together with the user information;

means for searching the message for the keyword;

means for, when the keyword is detected, specifying electronic mails having the same contents and commonly stored in mail boxes corresponding to the first terminal unit and the second terminal unit which has received the message;

means for reading the specified electronic mail from the mail box corresponding to the first terminal unit; and means for causing the first terminal unit to display the read electronic mail.

18. An electronic mail display method, comprising the steps of:

storing electronic mails transmitted and received by users in mail boxes in an electronic mail center, the mail boxes corresponding to respective users;

issuing a demand by a chat server of a chat system for a first terminal unit to display thereon a corresponding electronic mail in the mail box of a first user who is operating the first terminal unit, a predetermined keyword having been submitted from the first terminal unit, when the predetermined keyword is submitted in a character chat performed in the chat system and to which a plurality of the users participate; and displaying the corresponding electronic mail on respective terminal units of one or more users who are participating in the chat and who have the corresponding electronic mail in their corresponding mail boxes in the electronic mail center.

19. An electronic mail display method according to claim 18, wherein, when the plurality of users is two users;

the chat server causes the first terminal unit to display an electronic mail in a mail box and transmitted by the first user to a second user; and the chat server causes a second terminal unit operated by the second user to display a copy of the transmitted electronic mail stored in the corresponding mail box of the second user.

20. An electronic mail display method according to claim 18, wherein, when the plurality of users is two users;
  the chat server causes the first terminal unit to display an electronic mail in a mail box received by the first user from a second user; and
  the chat server causes a second terminal unit operated by the second user to display a copy of the received electronic mail stored in the corresponding mail box of the second user.

21. An electronic mail display method according to claim 18, wherein when a plurality of electronic mails to be displayed on a specific terminal unit are stored in the mail box corresponding to the user of the specific terminal unit, the chat server causes the specific terminal unit to display a list of the plurality of electronic mails.

22. An electronic mail display method according to claim 18, wherein when a statement including the predetermined keyword and a third keyword indicating a latest electronic mail has been submitted in the chat:
  the chat server causes a submitting terminal unit, from which the statement was submitted, to display the latest electronic mail in the mail box of a user operating the submitting terminal unit; and
  the chat server causes a second terminal unit operated by a second user to display an electronic mail which is stored in the mail box of the second user and which is a copy of the electronic mail displayed by the submitting terminal unit.

23. An electronic mail display method according to claim 18, wherein when a statement including the predetermined keyword and a fourth keyword designating a time has been submitted in the chat:
  the chat server causes a submitting terminal unit, from which the statement was submitted, to display an electronic mail transmitted or received at the designated time and stored in a mail box of a user operating the submitting terminal unit; and
  the chat server causes a second terminal unit operated by a second user to display an electronic mail which is stored in the mail box of the second user and which is a copy of the electronic mail displayed by the submitting terminal unit.

24. An electronic mail display method according to claim 18, wherein when a statement including the predetermined keyword and a term indicating a specified number of days preceding a current date has been submitted in the chat:
  the chat server causes a submitting terminal unit, from which the statement was submitted, to display an electronic mail of the specified number of days preceding the current date and stored in a mail box of a user operating the submitting terminal unit; and
  the chat server causes a second terminal unit operated by a second user to display an electronic mail which is stored in the mail box of the second user and which is a copy of the electronic mail displayed by the submitting terminal unit.

25. An electronic mail display method according to claim 18, wherein when a statement including the predetermined keyword and an identification information corresponding to an electronic mail identification field has been submitted in the chat:
  the chat server causes a submitting terminal unit, from which the statement was submitted, to display an electronic mail having the identification information and stored in a mail box of a user operating the submitting terminal unit; and
  the chat server causes a second terminal unit operated by a second user to display an electronic mail which is stored in the mail box of the second user and which is a copy of the electronic mail displayed by the submitting terminal unit.

26. An electronic mail display method according to claim 18, wherein when the predetermined keyword has been submitted in the chat and an electronic mail is being displayed on a submitting terminal unit from which a statement including the predetermined keyword has been submitted, the chat server causes a second terminal unit operated by a second user to display an electronic mail which is stored in the mail box of the second user and which is a copy of the electronic mail displayed by the submitting terminal unit.

27. An information communication system, comprising:
  a plurality of terminal units;
  an electronic mail center storing electronic mails received from the terminal units into corresponding mail boxes provided for electronic mail addresses, reading an electronic mail from a specific mail box in accordance with a reading instruction issued from a terminal unit corresponding to the specific mail box, and transmitting the read electronic mail to the corresponding terminal unit;
  a chat server transmitting a message received from a first terminal unit to a second terminal unit together with a first user information corresponding to the first terminal unit;
  means for setting a keyword for instructing display of a corresponding electronic mail stored in the specific mail box;
  means for searching the message transmitted from the first terminal unit for the keyword;
  means for searching the message for a second user information corresponding to the second terminal unit;
  means for specifying electronic mails commonly stored in the mail boxes respectively corresponding to the first terminal unit and the second terminal unit and having the same contents when the keyword is detected;
  means for reading the specified electronic mail from the mail box corresponding to the second terminal unit; and
  means for displaying the read electronic mail on the second terminal unit.

28. A chat server, comprising:
  means for receiving a message from a first terminal unit;
  means for identifying a first user information corresponding to the first terminal unit;
  means for transmitting the message to the first terminal unit together with the first user information;
  means for determining a keyword for instructing display of an electronic mail on the terminal unit;
  means for searching the message received from the first terminal unit for the keyword;
  means for searching the message for a second user information corresponding to a second terminal unit;
  means for querying for electronic mails commonly stored in mail boxes corresponding to the first terminal unit and the second terminal unit and having the same contents when the keyword is detected; and
  means for instructing to display an electronic mail obtained by said querying means on the second terminal unit.

29. A recording medium encoded with a computer program for performing a character chat by a chat system in which a plurality of users are participating who have transmitted and received electronic mails stored in mail boxes in an electronic mail center provided for respective users, said computer program comprising the functions of:

instructing the electronic mail center to display a first electronic mail stored in the mail box of a user who operates a submitting terminal unit, from which a predetermined keyword has been submitted, on the submitting terminal unit when the predetermined keyword has been submitted;

instructing the electronic mail center to display a second electronic mail on a second terminal unit operated by a second user participating in the chat and having the second electronic mail stored in the mail box thereof, the first and second electronic mails having the same contents; and prompting the users to set respective keywords.

30. A recording medium according to claim 29, wherein when the plurality of users is two users;

an instruction is issued to the electronic mail center to display on the submitting terminal unit an electronic mail stored in a mail box of and transmitted from the user of the submitting terminal unit to the second user; and an instruction is issued to the electronic mail center to display an electronic mail which is stored in a mail box of the second user and which is the same as the electronic mail displayed by the submitting terminal unit.

31. A recording medium according to claim 29, wherein when the plurality of users is two users:

an instruction is issued to the electronic mail center to display on the submitting terminal unit an electronic mail stored in a mail box of and transmitted to the user of the submitting terminal unit from the second user; and an instruction is issued to the electronic mail center to display a second electronic mail, stored in a mail box of the second user on the second terminal unit, the second electronic mail having the same contents as the electronic mail displayed by the submitting terminal unit.

32. A recording medium according to claim 29, wherein in each of the instructing steps, an instruction is issued to the respective terminal unit to display a list of the electronic mails when a plurality of electronic mails to be displayed on the terminal unit are stored in the mail box.

33. A recording medium according to claim 29, wherein when a statement including the predetermined keyword and a predetermined third keyword has been submitted in the chat from a specific terminal unit:

an instruction is issued to the electronic mail center to display on the specific terminal unit a latest electronic mail in a mail box for a user operating the specific terminal unit;

an instruction is issued to the electronic mail center to display on another terminal unit an electronic mail stored in the mail box for a user of the other terminal unit and having the same contents as the electronic mail displayed by the specific terminal unit; and the third keyword is set by each of the users.

34. A recording medium according to claim 29, wherein when a statement including the predetermined keyword and a fourth keyword for designating a time has been submitted in the chat from a specific terminal unit:

an instruction is issued to the electronic mail center to display an electronic mail transmitted or received at the designated time and stored in the mail box for a user operating the specific terminal unit;

an instruction is issued to the electronic mail center to display on another terminal unit an electronic mail stored in the mail box for a user of the other terminal unit and having the same contents as the electronic mail displayed by the specific terminal unit; and the form for designating the time of the fourth keyword is set by each of the users.

35. A recording medium according to claim 29, wherein when a statement including the predetermined keyword and a term indicating a specified number of days before a current date has been submitted in the chat:

the electronic mail center is instructed to display, on a specific terminal unit, from which the statement has been submitted, an electronic mail of the specified number of days before the current date and stored in the mail box for the user of the specific terminal unit; and the electronic mail center is instructed to display on another terminal unit an electronic mail stored in the mail box of a user of the other terminal unit and having the same contents as the electronic mail displayed by the specific terminal unit.

36. A recording medium according to claim 29, wherein:

an identification information is added to an electronic mail transmitted from each user;

when a statement including the predetermined keyword and a specified identification information has been submitted from a specific terminal unit in the chat, the electronic mail center is instructed to display on the specific terminal unit an electronic mail with the specified identification information, which is stored in the mail box for the user operating the specific terminal unit; and the electronic mail center is instructed to display on another terminal unit an electronic mail stored in the mail box for a user of the other terminal unit and having the same contents as the electronic mail displayed by the specific terminal unit.

37. A recording medium according to claim 29, wherein when the predetermined keyword has been submitted in the chat and an electronic mail is displayed on a terminal unit from which the predetermined keyword has been submitted, the electronic mail center is instructed to display on another terminal unit an electronic mail stored in the mail box for a user of the other terminal unit and having the same contents as the electronic mail displayed by the terminal unit from which the predetermined keyword has been submitted.

38. A recording medium encoded with computer program for receiving/transmitting a message, said computer program comprising the functions of:

receiving a message from a first terminal unit;

identifying a first user information corresponding to the first terminal unit from the message;

searching the message for a second user information corresponding to a second terminal unit;

transmitting the message to the second terminal unit together with the first user information;

determining a keyword for instructing display of an electronic mail on a terminal unit;

searching the message received from the first terminal unit for the keyword;

querying for electronic mails commonly stored in mail boxes corresponding to the first terminal unit and the second terminal unit and having the same contents when the keyword is detected; and instructing to display an electronic mail obtained by said querying function on the second terminal unit.

39. A recording medium encoded with computer readable program code means for receiving/transmitting a message, said program code means comprising the functions of:

causing a host computer to receive a message from a first terminal unit;

causing the host computer to identify a first user information corresponding to the first terminal unit;

causing the host computer to search the message for a second user information corresponding to a second terminal unit;

causing the host computer to transmit the message to the second terminal unit together with the first user information;

causing the host computer to determine a keyword for instructing display of an electronic mail on a terminal unit;

causing the host computer to search the message received from the first terminal unit for the keyword;

causing the host computer to query for electronic mails commonly stored in mail boxes corresponding to the first terminal unit and the second terminal unit and having the same contents when the keyword is detected; and causing the host computer to instruct display of an electronic mail obtained by said querying function on the second terminal unit.

40. A recording medium encoded with a computer program for an electronic mail display method, the electronic mail display method comprising the functions of:

storing electronic mails transmitted and received by users in mail boxes respectively provided for the users; and causing each of terminal units respectively operated by a plurality of the users to display an electronic mail in each of the respective mail boxes of the plurality of users in response to an instruction by a chat server for controlling a character chat in which the plural users are participating.

* * * * *